(12) United States Patent
Hegge et al.

(10) Patent No.: US 11,536,867 B2
(45) Date of Patent: Dec. 27, 2022

(54) DEBLENDING USING DICTIONARY LEARNING WITH VIRTUAL SHOTS

(71) Applicant: Saudi Arabian Oil Company, Dhahran (SA)

(72) Inventors: Robertus F. Hegge, Rijswijk (NL); Rolf Huibert Baardman, Rotterdam (NL)

(73) Assignee: Saudi Arabian Oil Company, Dhahran (SA)

(*) Notice: Subject to any disclaimer, the term of this patent is extended or adjusted under 35 U.S.C. 154(b) by 615 days.

(21) Appl. No.: 16/528,110

(22) Filed: Jul. 31, 2019

(65) Prior Publication Data

US 2021/0033740 A1  Feb. 4, 2021

(51) Int. Cl.
*G01V 1/36* (2006.01)
*G01V 1/28* (2006.01)

(52) U.S. Cl.
CPC .............. *G01V 1/364* (2013.01); *G01V 1/282* (2013.01); *G01V 2210/125* (2013.01); *G01V 2210/127* (2013.01); *G01V 2210/38* (2013.01)

(58) Field of Classification Search
CPC .. G01V 1/364; G01V 1/282; G01V 2210/125; G01V 2210/127; G01V 2210/38
USPC .......................................................... 702/17
See application file for complete search history.

(56) References Cited

U.S. PATENT DOCUMENTS

| | | |
|---|---|---|
| 9,207,345 B2 | 12/2015 | Khalil et al. |
| 9,602,781 B2 | 3/2017 | Claussen et al. |
| 9,945,972 B2 | 4/2018 | Baardman et al. |
| 9,966,088 B2 | 5/2018 | Mysore et al. |
| 2013/0236115 A1* | 9/2013 | Nguyen .............. H04L 27/0006 382/260 |
| 2015/0241587 A1 | 8/2015 | Baardman et al. |

(Continued)

FOREIGN PATENT DOCUMENTS

CN  109765608  5/2019

OTHER PUBLICATIONS

Wu et al., "Attenuating seismic noise via incoherent dictionary learning," Journal of Geophysics and Engineering, Apr. 2018, 15(4):1327-1340.

(Continued)

*Primary Examiner* — Michael P Nghiem
(74) *Attorney, Agent, or Firm* — Fish & Richardson P.C.

(57) ABSTRACT

Systems and methods include a method for deblending signal and noise data. A shot domain for actual sources, a receiver domain for virtual sources, and a receiver domain for actual sources are generated from blended shot data. A dictionary of signal atoms is generated. Each signal atom includes a small patch of seismic signal data gathered during a small time window using multiple neighboring traces. A dictionary of noise atoms is generated. Each noise atom includes a small patch of seismic noise data gathered during a small time window using multiple neighboring traces. A combined signal-and-noise dictionary is generated that contains the signal atoms and the noise atoms. A sparse reconstruction of receiver domain data is created from the combined signal-and-noise dictionary. The sparse reconstruction is split into deblended data and blending noise data based on atom usage to create deblended shot domain gathers for actual sources.

17 Claims, 21 Drawing Sheets

(56) References Cited

U.S. PATENT DOCUMENTS

2018/0136353 A1* 5/2018 Zhao .................. G01V 1/28
2018/0267188 A1   9/2018 Turquais et al.

OTHER PUBLICATIONS

PCT International Search Report and Written Opinion in International Appln. No. PCT/US2020/044019, dated Oct. 5, 2020, 18 pages.
Berkhout, "Changing the mindset in seismic acquisition," The leading edge, vol. 27, No. 7, Jul. 2008, 11 pages.
Berkhout, "Seismic migration, imaging of acoustic energy by wave field extrapolation, a: theoretical aspects," Elsevier, 1982.
Mahdad et al., "Separation of blended data by iterative estimation and subtraction of blending interference noise," Geophysics, vol. 76, No. 3, May-Jun. 2011, 9 pages.
Turquais et al., "Sparsity promoting morphological decomposition for coherent noise suppression: application to streamer vibration related noise," SEG International Exposition and 86th Annual Meeting, 2016, 5 pages.

* cited by examiner

900

1000

1600

1900

DEBLENDING USING DICTIONARY LEARNING WITH VIRTUAL SHOTS

BACKGROUND

The present disclosure applies to deblending data acquired from simultaneous sources. Conventional deblending techniques can typically begin with transforming or sorting blended shot data into another domain, for example, a common receiver domain. As a result of the transformation, only the signal from one series of shots remains coherent, and the signals from the other blended shots provide blending noise (for example, mostly spikes). Conventional deblending techniques can then perform coherency filtering or denoising in the other domain. Conventional deblending techniques can optionally iterate between transforming and filtering/denoising steps or between the various blended shots. Use of conventional deblending techniques can allow the coherent signal content of individual shot records to be built up or to be separated out from the other interfering blended shots. Conventional deblending methods may require users to make a series of manual adjustments on testing various parameter settings to determine the impact that the parameter settings have on results. Artificial intelligence techniques, such as dictionary learning, are typically unable to distinguish between signal and noise without using an additional classification algorithm.

SUMMARY

The present disclosure describes techniques that can be used for deblending data acquired from simultaneous sources based on dictionary learning. In some implementations, a computer-implemented method for deblending signal and noise data includes the following. A shot domain for actual sources, a receiver domain for virtual sources, and a receiver domain for actual sources are generated from blended shot data of a seismic survey of an area that includes signal data and noise data. During a first dictionary learning process using the shot domain for the actual sources, a dictionary of signal atoms is generated. Each signal atom includes a small patch of seismic signal data gathered during a small time window using multiple neighboring traces in a seismic gather. In some implementations, ranges associated with each of the "small patch" and the "small time window" can be in a range, for example, of 100 milliseconds of data across 20 consecutive traces. For seismic data, such a patch can correspond to a series of samples within a certain time range across a series of consecutive traces in a gather, where each trace corresponds to the recorded time series at a particular receiver for a certain experiment. During a second dictionary learning process using the receiver domain for the virtual sources, a dictionary of noise atoms is generated. Each noise atom includes a small patch of seismic noise data gathered during a small time window using multiple neighboring traces in a seismic gather. A combined signal-and-noise dictionary is generated that contains the signal atoms from the dictionary of signal atoms and the noise atoms from the dictionary of noise atoms. A sparse reconstruction of receiver domain data is created from the combined signal-and-noise dictionary. The sparse reconstruction is split into deblended data and blending noise data based on atom usage to create deblended shot domain gathers for actual sources.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, acquiring data in blended fashion can be more cost-effective than acquiring only unblended data. This can occur since more data can be acquired in the same time, or the same amount of data can be acquired in less time, or both. Second, because seismic data processing and imaging techniques still require unblended data as input, any method that can provide improved deblending results can improve results. In addition, automatic processes can be an improvement, as most current deblending techniques require a user to test various parameter settings to obtain the best results. Third, automated blending/unblending techniques and associated repetitive tasks can be done by computers, allowing users to spend their time more effectively. Fourth, since dictionary learning can infer the dictionary from the data itself, dictionary learning can lead to significantly sparser representations than what can be obtained with predefined dictionaries, such as used in Fourier or wavelet transforms. This can provide computational benefits and can reduce memory requirements. Fifth, the benefit of deriving both a signal dictionary and a noise dictionary is that a representation of the blended data using both dictionaries can be immediately split into its signal and noise components (or, in other words, deblended).

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
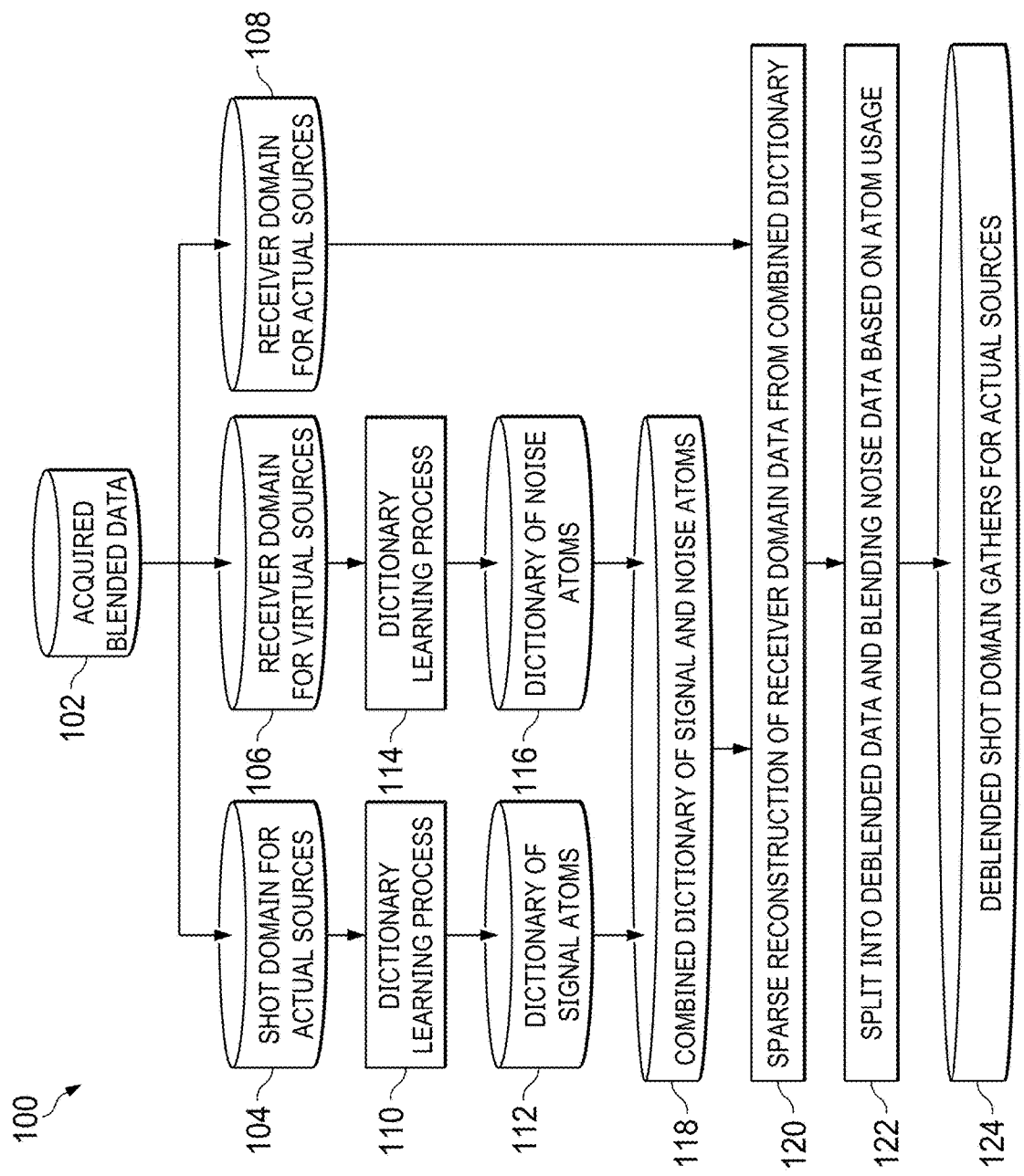
FIG. 1 is flowchart of an example of a general deblending algorithm, according to some implementations of the present disclosure.

The following detailed description describes techniques for deblending signal and noise, such as in geological surveys used in the oil industry. For example, techniques can include a process for deblending shot gathers from a time-and-space-oriented segmented (which can be called "atoms") and combined signal-and-noise dictionary. The combined dictionary can be built using actual sources and in part using virtual sources. The techniques can include automatically selecting values for parameters used during deblending, and distinguishing between signal and noise.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Deblending is a process that includes separating data that has been generated by several sources (and recorded simultaneously) into several datasets so that the datasets can appear to be generated by a single source and recorded separately. In some implementations, deblending techniques can include the use of dictionary learning.

Dictionary learning techniques can include processes for generating a dictionary of atoms from a dataset of source data, where the dictionary of atoms can represent the data in a sparse manner. Individual records of the dataset can be decomposed into the atoms. Individual records of the dataset can later be recreated from (or composed from) a sub-selection of the atoms, where the sub-selection can use appropriate weights applied to the atoms. For example, in situations in which atoms overlap, weights can be used to scale each of the atoms. As a result, the atoms can be stacked together. For example, for each sample location in the overlap, the scaled amplitude values can be summed together. In this way, stacked atoms can resemble a full record.

Dictionary learning can be used to derive a dictionary of building blocks or basis functions referred to as atoms, which can be used to describe the data completely. Deblending techniques need to know or determine which atoms refer to signal and which atoms refer to noise in order to separate signal from noise. Separating signal from noise afterwards can be very difficult. Therefore, a main aspect of the present disclosure is to create two separate input datasets: a first dataset containing only signal, and a second dataset containing only blending noise. Separate dictionary learning processes can be performed for each of the two datasets, creating dictionaries for each. The two dictionaries can be combined into a combined dictionary, which can represent the blended data while allowing the blending noise to be separated from the signal.

Dictionary learning and other types of processes can operate on complete gathers, or on combinations of overlapping and non-overlapping patches of the data gathers. Each patch can be a potential dictionary atom. The sparse reconstruction of dictionaries can use any minimization method which provides a sparse solution which, for example, uses a small number of dictionary atoms. In some implementations, solutions can be accomplished with an objective function, for example, with either an L-one or an L-zero norm.

In some implementations, atoms can have different sizes (in one or more dimensions). For example, implementations having different size atoms can provide benefits, such as efficiency improvements gained by a reduced number of atoms. For example, a signal may be better represented with slightly larger patches than those used for blending noise.

If a dictionary can be established to represent unblended data, then the same dictionary can also represent blended data. A main difference is that more atoms are needed in areas of overlap where multiple sources contribute data. However, deblending the blended data can remain problematic as individual atoms cannot be attributed to particular deblended datasets (as described with reference to FIG. 9).

Blended data in the shot domain or unblended data in any domain are both usable as input for a dictionary learning process to derive the signal atoms. Hence, the challenge is to determine a way to solve the problem of representing purely blending noise. The present disclosure provides a solution to the problem, as outlined in the following experiment.

For example, suppose an experiment begins by acquiring data from a series of simultaneous source experiments with, for example, two sources. However, assume that no source energy was injected into the earth for one of the two sources, for example, due to some form of equipment failure. An acquisition system would still record the position and timing of all shots including the sources that failed. During data processing, the records can be transformed to another domain (for example, a common receiver domain), which can align for the failed shots. Then the other shots do not align, and the recorded signal, which comes only from those latter shots, ends up as pure blending noise records. In practice, such a series of failed shots is typically not allowed to occur. However, similar effects can be mimicked in the computer by introducing the notion of virtual shots.

As an example, one kind of pure blending noise input can be generated as follows. First, processing can pretend that an unblended record is blended by another shot (referred to as virtual shot in the following). Second, the virtual shots can be aligned by transforming or sorting the data to a domain (for example, a common receiver domain). In this domain, the signal of the actual unblended record represents the blending noise for the virtual shot (as there is no energy from the virtual shot and hence no signal). Third, the data can be used as input for a second dictionary learning process. This act of pretending that a record is blended by another source provides a way to generate the input representing blending noise for a dictionary learning method to derive noise atoms. The subsequent processing can be computer-implemented, as described in the present disclosure.

In a process called pseudo-deblending, the blended data can be transformed into data containing both coherent and incoherent energy. The coherent energy refers to energy generated by a particular source, as opposed to the incoherent energy being generated by all other sources. The incoherent energy is often referred to as the blending noise. As before, if a dictionary is established to represent both coherent and incoherent energy, then individual atoms still need to be attributed to either of those forms of energy in order for the atoms to be attributed to particular sources.

Hence, instead of attempting to solve these kind of attribution problems afterwards (which is done by conventional techniques), the underlying idea is to resolve this manner upfront. Attribution to particular sources is possible by changing the way the atoms are obtained by actually deriving two separate dictionaries (one for the coherent signal and one for the incoherent noise parts) and combining those two into a single dictionary to represent the blended data (see FIGS. 10-12). Deblending can then become a matter of selecting and keeping (or discarding) an appropriate set of atoms. "Appropriate," in this sense, refers to the atoms corresponding to either signal or noise. The dictionary for the coherent signal can be derived from the data in the shot domain (see FIGS. 2 and 3). The dictionary for the incoherent noise is made possible by the creation of input gathers containing just blending noise (see FIG. 7), which involves the primary new idea of using virtual shots.

Theory of (De)Blending

A frequency slice of the data of a two-dimensional (2D) seismic survey can be represented as a data matrix P containing complex values. Each column of data matrix P can represent a monochromatic shot gather. Each row of data matrix P can represent a receiver gather. In some implementations, the data matrix P can be decomposed as a product of three matrices. For example, data matrix P=DXS, where D represents the receiver array matrix, X represents the transfer function of the earth, and S represents the source matrix. Each column of data matrix P can represent an experiment, and each row of data matrix P can correspond to a lateral source position. Other more extensive but similar ways exist for representing data for a three-dimensional (3D) seismic survey. Both matrix-like notations are a common way of describing data of the survey.

In a blended seismic experiment, an additional blending operator $\Gamma$ can be added to the right-hand side that applies to the source matrix S, yielding a representation of the blended data matrix $P_{bl}$=DXS$\Gamma$. Generally, the operator $\Gamma$ can contain fewer columns (or experiments) than contained by S. Further, DXS$\Gamma$ can contain two or more non-zero entries in each column, for example, for column k and row: $\Gamma_{kl}$=e^{-j\omega\Delta t_{kl}}. The non-zero entries of T effectively add particular time delays (for example, $\Delta t_{kl}$) to certain sources in an experiment, and thereby can combine (or blend) the effect of these sources into a single recording. The number of sources combined in a single experiment can be referred to as blending factor b. The number of columns in the blended data matrix are then 1/b times that of the unblended data matrix if the total number of sources remains the same. A pseudo-deblended result can be obtained by copying each blended shot gather b times and by correcting each copy for one of the time delays uniquely. Then, the data matrix after pseudo-deblending can then again be a square matrix. The action of pseudo-deblending can also be described in terms of the action by a matrix $\Gamma^H$. Note that $\Gamma^H$ is the Hermitian of $\Gamma$, which approximates its inverse, thus $P_{ps}$=$P_{bl}\Gamma^H$=DXS$\Gamma\Gamma^H$≈DXS.

Blended data can be transformed or sorted into another domain. The other domains can be, for example, a common receiver domain or a common offset domain. For example, the common receiver domain corresponds to the rows of the data matrix, and the common offset domain corresponds to the (off-) diagonals of the data matrix. Afterwards, the data from the aligned set of sources can be referred to as coherent, for example, after correction for their respective time delays and the data from the other sources that are incoherent (see FIGS. 4 and 5). The incoherent data can be referred to as the blending noise. This blending noise, for example, contains information from the other sources, such as their wavelets. Deblending can be done, for example, by iteratively estimating and subtracting the blending noise.

In some implementations, processes can take already blended data and pretend the data is blended with yet another (virtual) shot. For example, the same steps as previously described can be used.

In some implementations, the traces of unblended or blended data can be shifted randomly or pseudo-randomly in time. For example, the time shifts can be determined from a probability density function representative of blended acquisition variations. In some implementations, blended or unblended data records can be transformed or sorted into another domain, followed by applying similar random time shifts.

Dictionary Learning

Given an input dataset X consisting of K data vectors $[x_1, \ldots, x_K]$ of dimension d, a goal of the present disclosure can include finding a dictionary D consisting of n atoms or data vectors $[d_1, \ldots, d_n]$ of dimension d and a representation R consisting of K weighting vectors $[r_1, \ldots, r_K]$ of dimension n, such that the difference between X and DR is minimal in some norm. For example, the norm that is used can be least squares, while the representations $r_i$ are sparse enough, where i refers to an element in the range 1 to K. This can be formulated as a constrained optimization problem with appropriate constraints placed on the elements of the representation R to achieve sparsity, as well as on the atoms of the dictionary D, in order to avoid arbitrary high amplitudes of atoms being compensated for by arbitrary low but non-zero amplitudes of the representation elements. The literature provides several algorithms to solve these constrained optimization problems, for example, K-SVD and stochastic gradient descent.

In image processing applications, each data vector can generally correspond to a small 2D patch of an image, such as a few pixels by a few pixels. The various patches can cover the full image and be overlapping. The patches may also cover a series of images.

For seismic data, such a patch can correspond to a series of samples within a certain time range across a series of consecutive traces in a gather, where each trace corresponds to the recorded time series at a particular receiver for a certain experiment. These patches can be referred to as time and space windows. Depending on the application, such a gather can be either a common source, a common receiver, a common offset, or a common midpoint gather. The gather can contain either unblended or blended data.

A dictionary can be derived, for example, from the blended data in the shot domain. However, as mentioned previously, the atoms of the dictionary may not be attributable to one particular unblended dataset.

The dictionary can be derived from the blended data in the common receiver domain. As a result, it is likely, but not guaranteed, that certain atoms will be representative of the coherent signal, where other atoms will be representative of the incoherent parts or blending noise. However, some atoms may represent both signal and noise (see FIG. 9).

Figure 8:
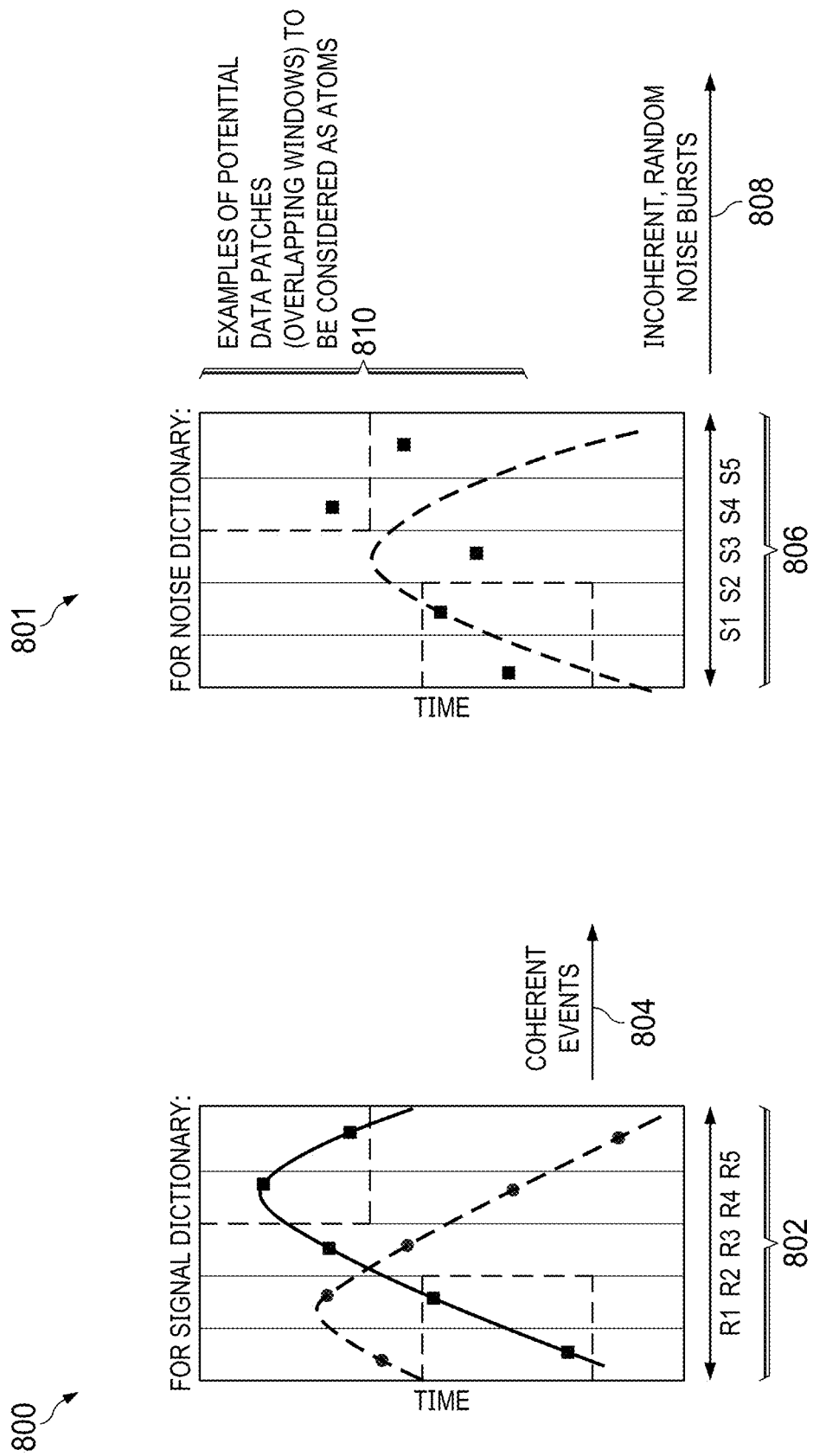
FIGS. 8A-8B are diagrams showing examples of conceptual transitions for gathers represented by signal and noise dictionaries, respectively, according to some implementations of the present disclosure.
Figure 10:
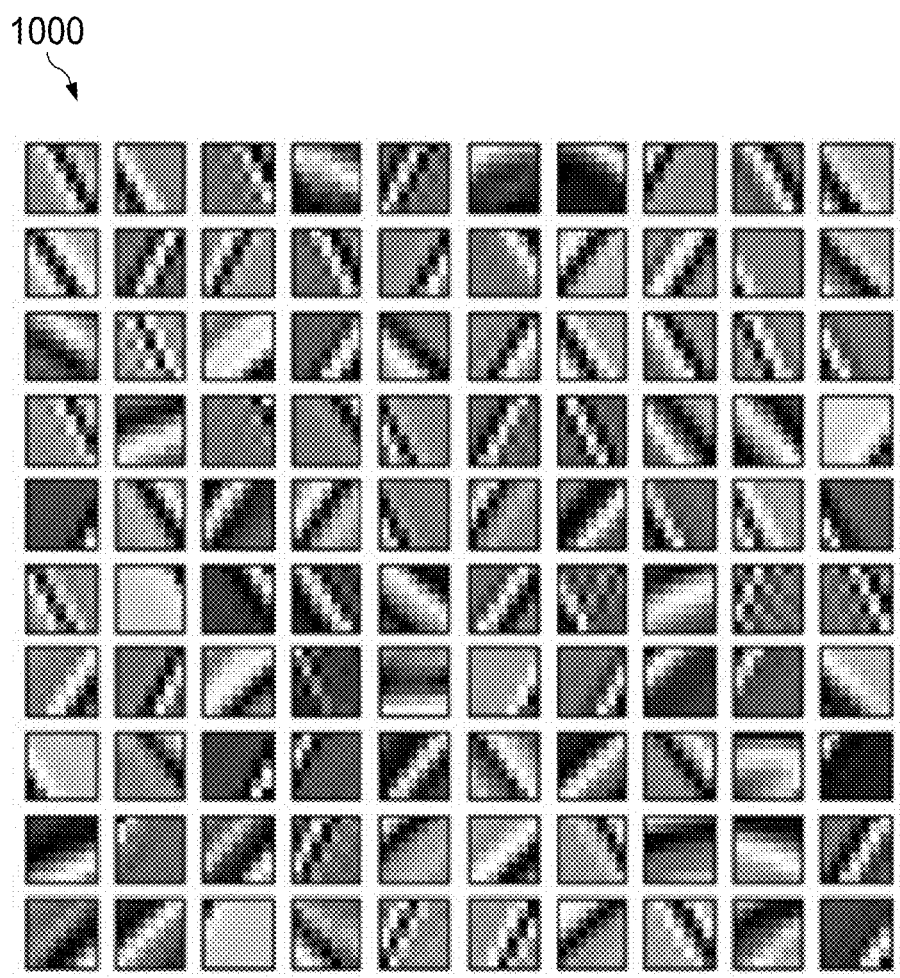
FIG. 10 is a plot showing an example of a dictionary of signal atoms, according to some implementations of the present disclosure.
Figure 11:
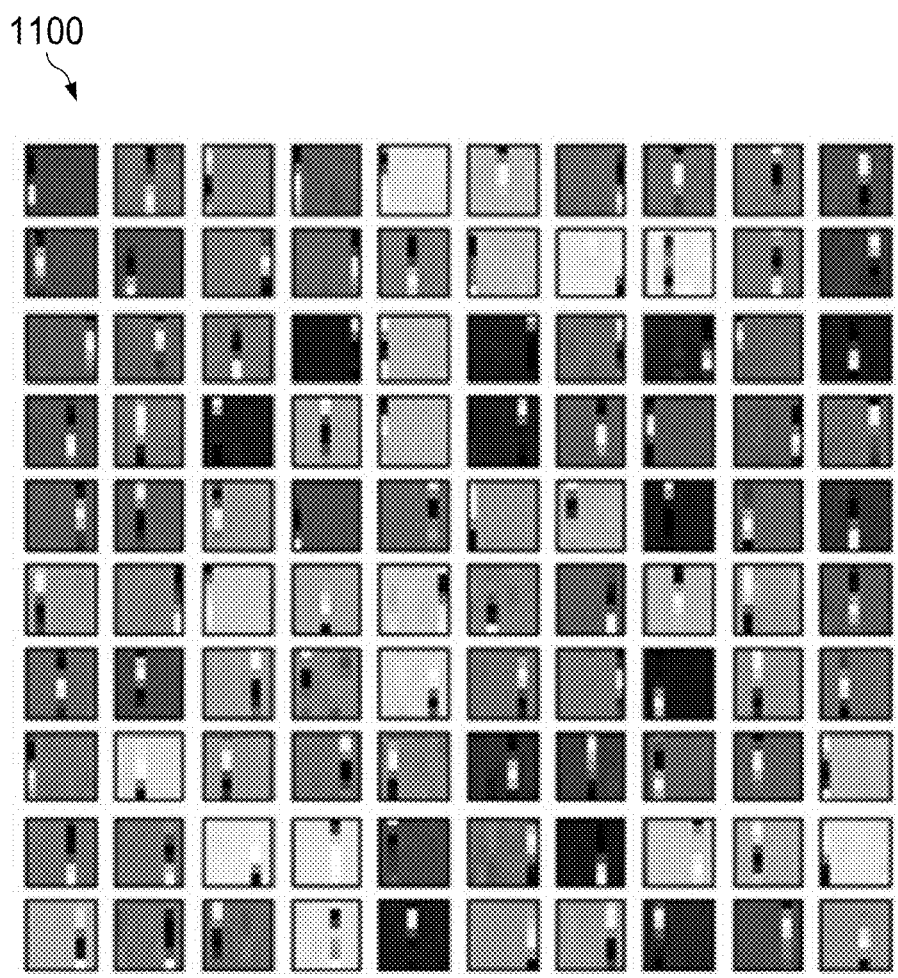
FIG. 11 is a plot showing an example of a dictionary of noise atoms, according to some implementations of the present disclosure.

In order to circumvent these problems, techniques of the present disclosure can be used to derive one dictionary that is entirely representative of the signal components (see FIGS. 8 and 10) and another separate dictionary that is entirely representative of the noise components (see FIGS. 8 and 11). The combination of the two dictionaries (see FIG. 12) can then be capable of representing blended data in a domain containing both signal and blending noise.

The first dictionary for the signal can be derived from unblended data in any domain, or from blended data in the common shot domain. The second dictionary for the noise can be derived from unblended or blended data using the following. First, the process can pretend that these data contain additional virtual sources (see FIGS. 4 and 6). This can be done by adding an additional phase shift entry to each column of the operator Γ, creating Γ', while keeping track of these additional entries. Second, pseudo-deblending for these virtual sources (see FIG. 6) can occur by using the corresponding Γ'. Third, the learning process can be performed to the data in the common receiver or offset domains, as this will now only contain blending noise (see FIG. 7 and FIG. 8B).

Since time shifts of the virtual sources are effectively corrected in the second step, the same effect can be obtained if similar time shifts are applied directly to the data in the common receiver domain. These time shifts can be pseudo-random if they are representative of those for actual sources.

In some implementations, completely random time shifts can be applied alternatively to generate similar blending noise datasets.

FIG. 1 is flowchart of an example of a general deblending algorithm 100, according to some implementations of the present disclosure. Acquired blended data 102 can be sorted into a shot domain for actual sources 104, a receiver domain for virtual sources 106, and a receiver domain for actual sources 108. A dictionary learning process 110 can use the shot domain for actual sources 104 to create a dictionary of signal atoms 112. A dictionary learning process 114 can use the receiver domain for virtual sources 106 to create a dictionary of noise atoms 116. The dictionary of signal atoms 112 and the dictionary of noise atoms 116 can be combined into a combined dictionary of signal and noise atoms 118. A sparse reconstruction step 120 can perform a sparse reconstruction of receiver domain data from the combined dictionary. A splitting step 122 can split the combined dictionary into deblended data and blended noise data based on atom usage, producing deblended shot domain gathers for actual sources 124.

In some implementations, creating the sources 104, 106, and 108 can include one or more ways of sorting the data or possibly applying appropriate time shifts. In some implementations, the receiver domain for virtual sources 106 can be a receiver domain with pseudo-random time shifts or a receiver domain with random time shifts. A receiver domain can be a common offset domain or a common midpoint domain. Inputs to either or both of the shot domain for actual sources 104 and the receiver domain for virtual sources 106 can include unblended data. Each of the dictionary learning processes 110 and 114 can be replaced using other techniques that derive a set of similar atoms with which their respective inputs can be reconstructed.

Shots can be provided, for example, by an array or a group of vibration-emitting equipment, where each can be considered a single source. For example, one or more arrays that each contain several air guns can be used as a single source, such as in marine streamer acquisition. Other types of shots can be provided through the use of explosions, such as from dynamite, which can provide a greater impulsive source, as opposed to a sweep generated by a Vibroseis truck, for example. The techniques used in the present disclosure can be independent of the type or size of the shot source.

The terms "shot" and "source" can sometimes be used interchangeably, although the terms can have different meanings depending on context. For example, shot data can refer to the data recorded when one source is fired (or activated). Blended shot data can refer to the data recorded when more than one source is fired, even if the source locations or source activation times are sufficiently apart (for example, above pre-determined thresholds of distance and time, respectively).

Example basis functions, in the context of the present disclosure, can include an atom that is typically a small patch of seismic data, for example, within a small time window for several neighboring traces in a seismic gather. Potential atoms can be created from training data, for example, by selecting such patches from all over the various gathers. Patches can overlap in one or both times and with regard to the traces used, and patches can be tapered afterwards.

Figure 2:
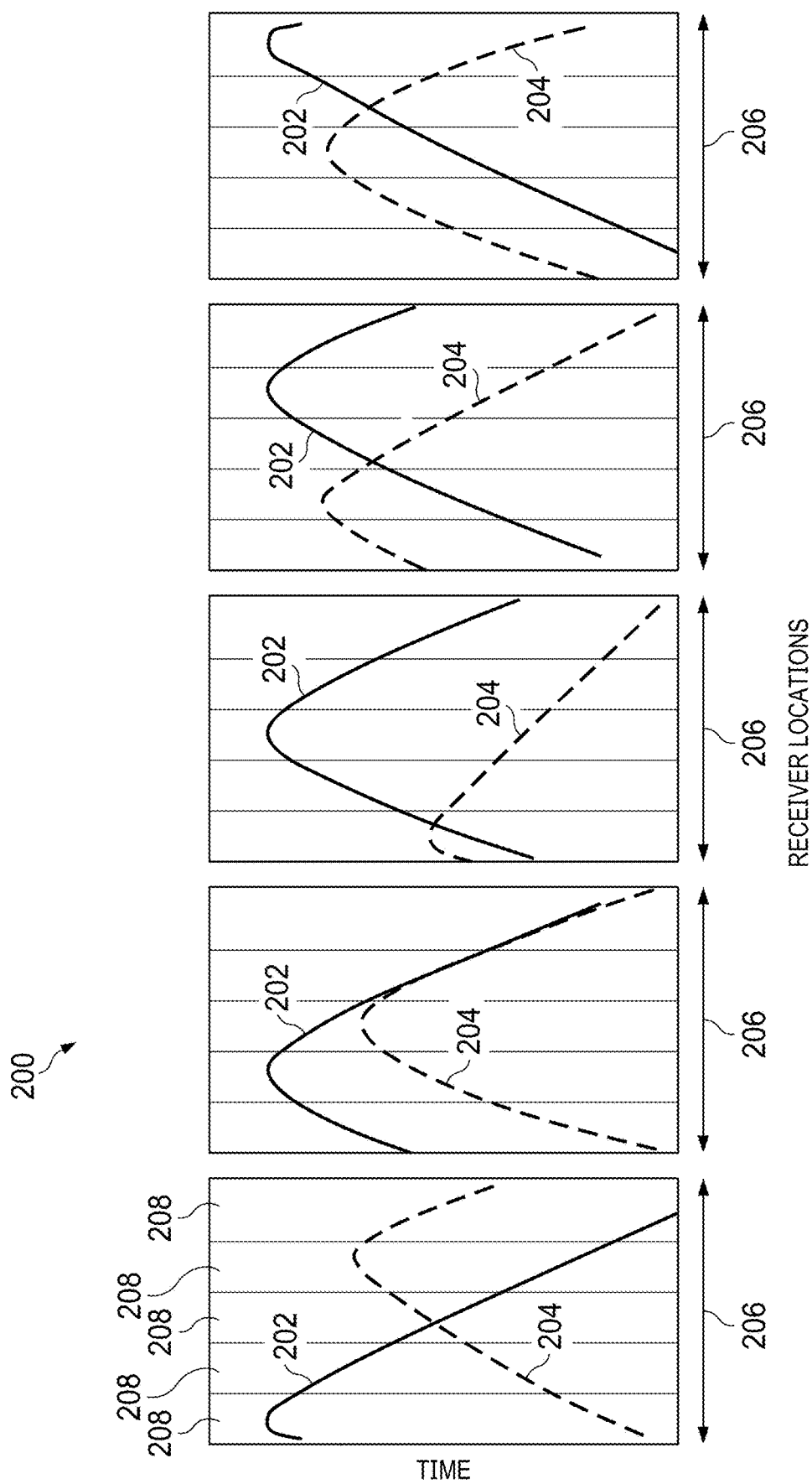
FIG. 2 is a set of graphs showing examples of blended shot gathers, according to some implementations of the present disclosure.

FIG. 2 is a set of graphs 200 showing examples of blended shot gathers, according to some implementations of the present disclosure. For example, the graphs 200 represent an example of the shot domain for the actual sources 104 of FIG. 1. Blended shot gathers from primary sources 202 and secondary sources 204 are shown at different received locations 206. In this case, the secondary sources 204 were excited after a random delay and at an arbitrary location. Each vertical box 208 represents a recorded measurement as a time series (commonly known as a trace). The curves plotted through the measurements represent events normally seen in seismic data (for example, a reflection event). The graphs of FIGS. 2-8 are basic graphical representations of actual data, for example, presented in FIGS. 13-15.

Figure 3:
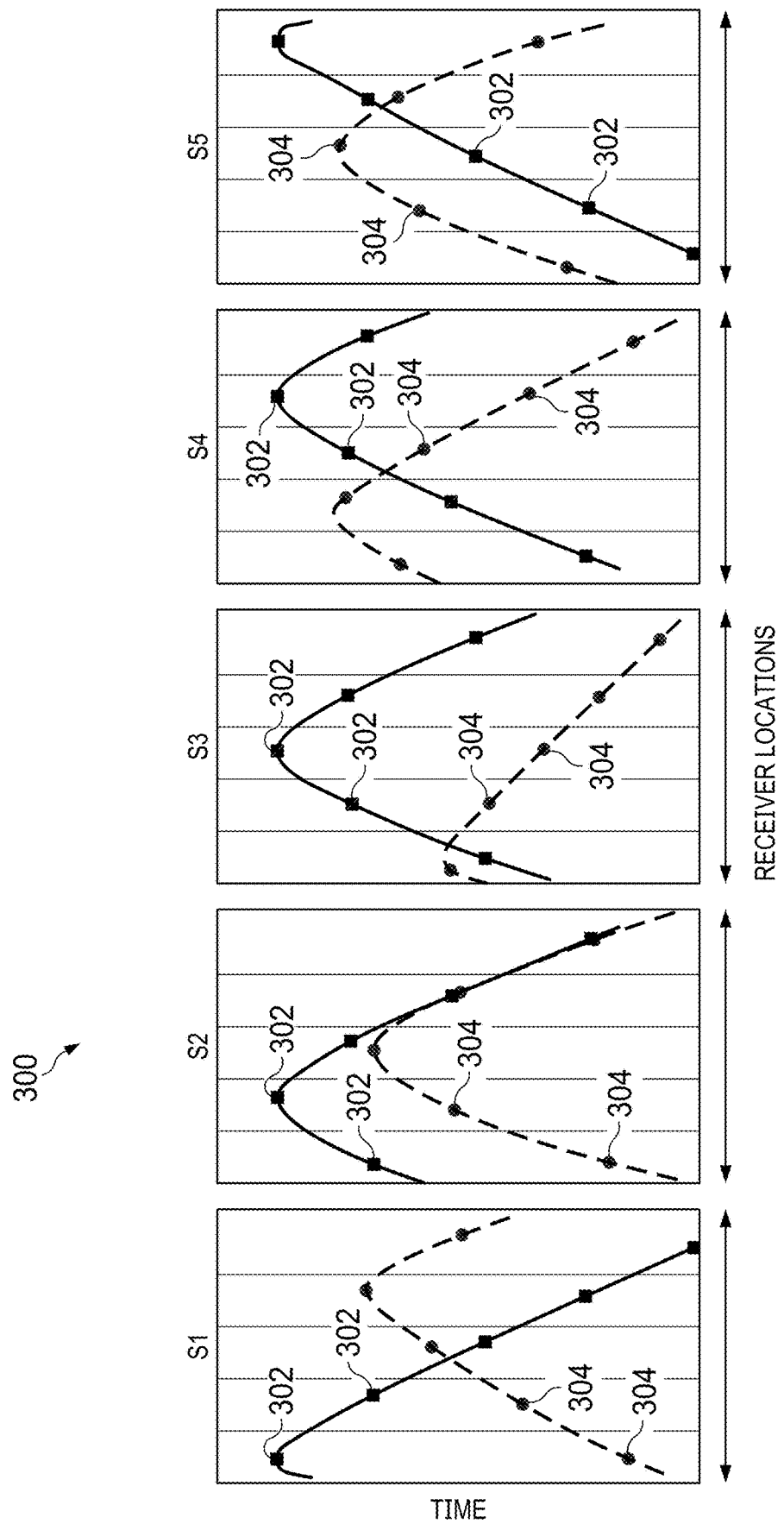
FIG. 3 is a set of graphs showing examples of blended shot gathers with events highlighted from both sources and each receiver, according to some implementations of the present disclosure.

FIG. 3 is a set of graphs 300 showing examples of blended shot gathers with events 302 and 304 highlighted from both sources and each receiver, according to some implementations of the present disclosure. For example, FIG. 3 is similar to FIG. 2, except closed squares and closed circles representing, respectively, the events 302 and 304 are added to better show the effects of the transform-to-receiver domain in FIG. 4. The squares and circles depicting events in FIG. 3 highlight the corresponding non-zero amplitude time samples. In some implementations, events 302 can be referred to as earliest shot responses, and events 304 can be referred to as delayed-shot responses. Events 408 and 504 can be referred to as coherent events. The set of amplitudes denoted by events 402 is the same as the set of amplitudes denoted by events 508. Similarly, events 404 and 502 have similar amplitudes. In FIGS. 3-7, shots are labeled as S1-5, and receivers are labeled as R1-5.

Figure 4:
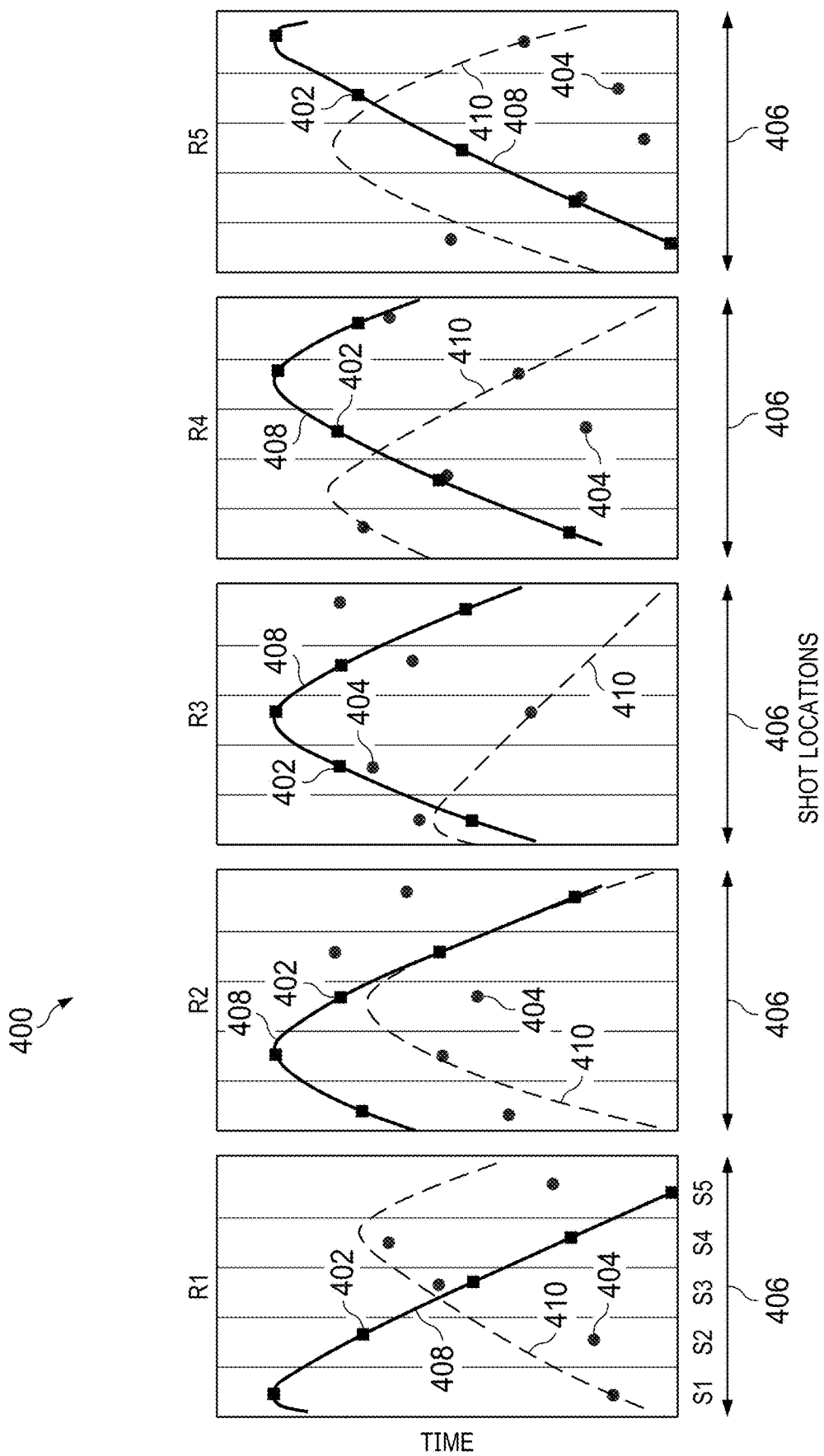
FIG. 4 is a set of graphs showing an example of a result of a transform from a common shot domain to a common receiver domain while aligning for some sources, according to some implementations of the present disclosure.

FIG. 4 is a set of graphs 400 showing an example of a result of a transform from a common shot domain to a common receiver domain while aligning for some sources, according to some implementations of the present disclosure. Source events 402 align again (as compared to the events 302 of FIG. 3), aligning to continuous lines 408. However, source events 404 scatter due to random delays at shot locations 406. This result is equivalent to pseudo-blending for the source events 402. The set of graphs 400 provide an example of the receiver domain for actual sources 108 of FIG. 1, for example. Dashed lines 410 indicate where the events 404 would occur if traces were to be aligned for the time delays of the corresponding sources. Closed circles depicting the events 404 correspond to actual data from corresponding sources. The transition of FIG. 3 to FIG. 4, for example, can be done by rearranging, reordering, or regrouping the vertical boxes, which are the recorded measurements (traces). Note that FIG. 3 shows five blended shot experiments for five receivers each, while FIG. 4 shows five common receiver gathers containing traces from five shot experiments each.

Figure 5:
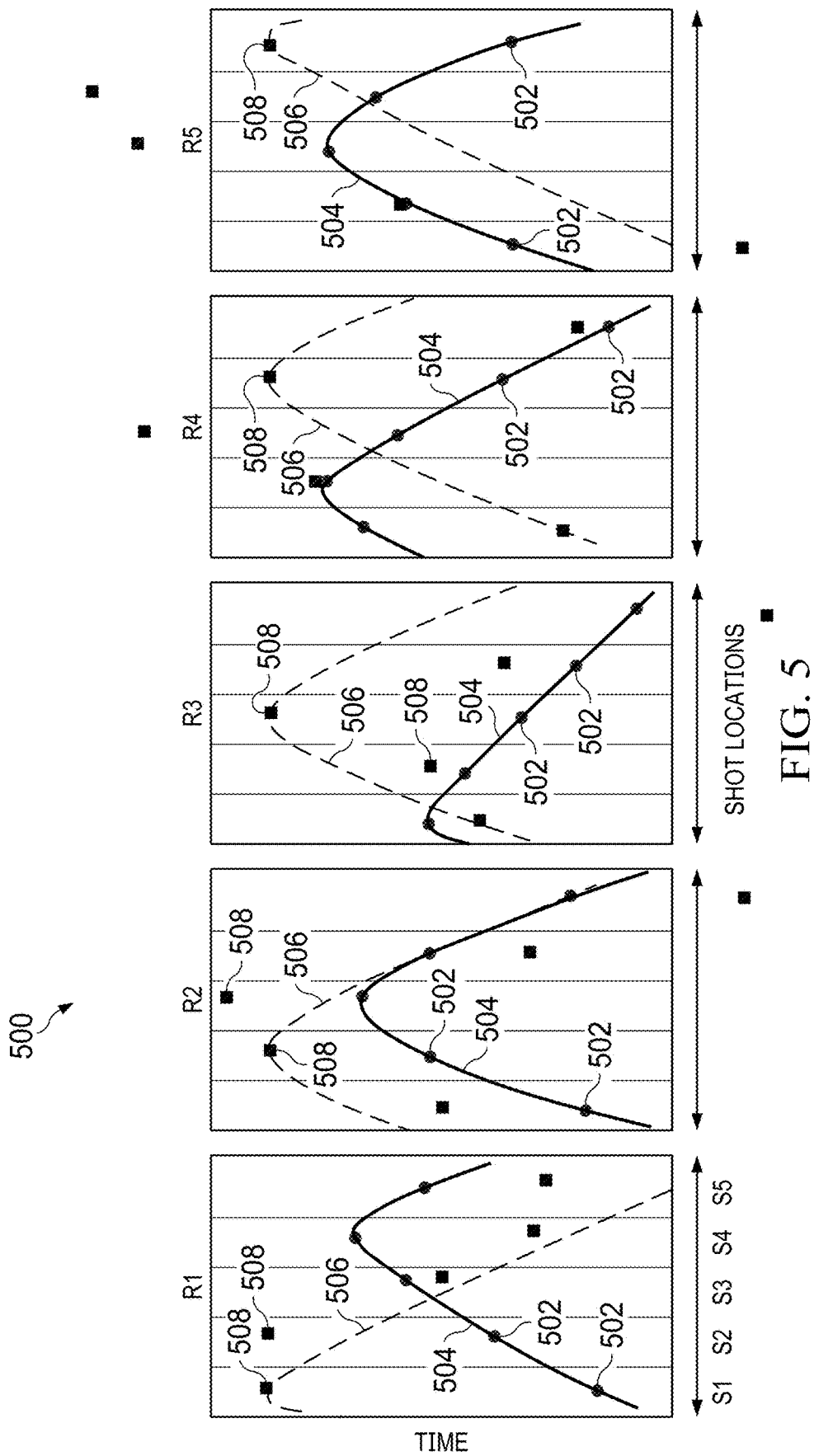
FIG. 5 is a set of graphs showing examples of data in a receiver domain being aligned for different sources, according to some implementations of the present disclosure.

FIG. 5 is a set of graphs 500 showing examples of data in a receiver domain being aligned for different sources 502, according to some implementations of the present disclosure. The graphs 500 can also represent the receiver domain for actual sources 108 in FIG. 1. An alignment exists for different sources 502, as represented by continuous lines 504. Thinner dashed lines 506 indicate where events 508 would occur if traces were to be aligned for the time delays of the corresponding sources.

Figure 6:
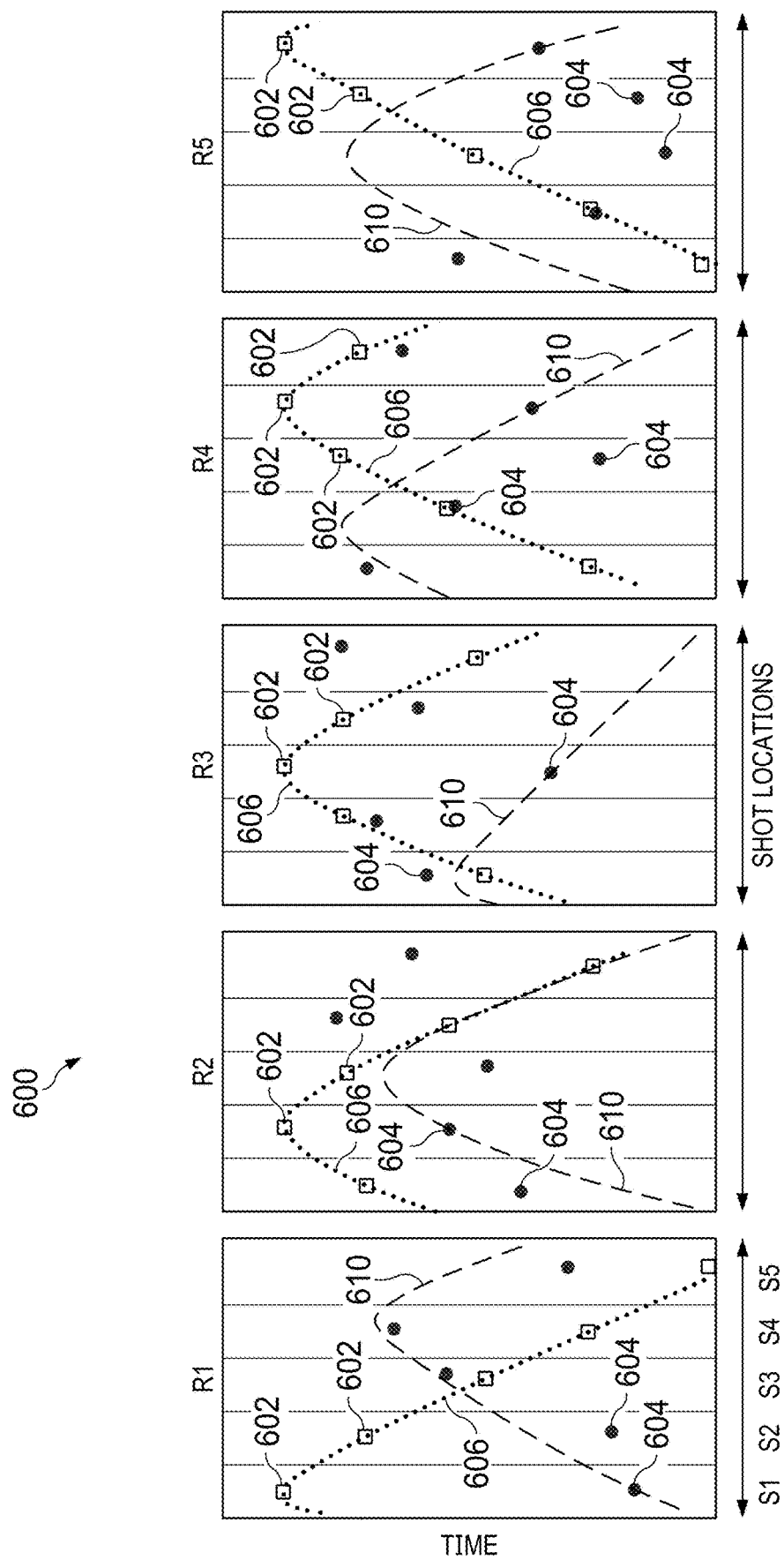
FIG. 6 is a set of graphs showing examples of events in a same receiver domain, according to some implementations of the present disclosure.

FIG. 6 is a set of graphs 600 showing examples of events in a same receiver domain, according to some implementations of the present disclosure. FIG. 6 uses the same data with virtual sources (hence depicted as open squares) for events 602, compared to actual sources in FIG. 4. Events 602 can be associated with s virtual source, for example, in a pseudo deblend for the source. As a result, even though the events 602 do not exist, the events align with dotted lines 606. Events 604 scatter due to random delays. For example, an alignment still exists for the events 602 from the virtual sources, aligned to the dotted lines 606. The open squares that are used for the event 602 indicate where the events would be located if the sources were real instead of virtual. The dashed line 610 indicate where the events 604 would occur if traces were to be aligned for the time delays of the corresponding sources. As a result, only the solid circles of the events 604 correspond to actual data.

Figure 7:
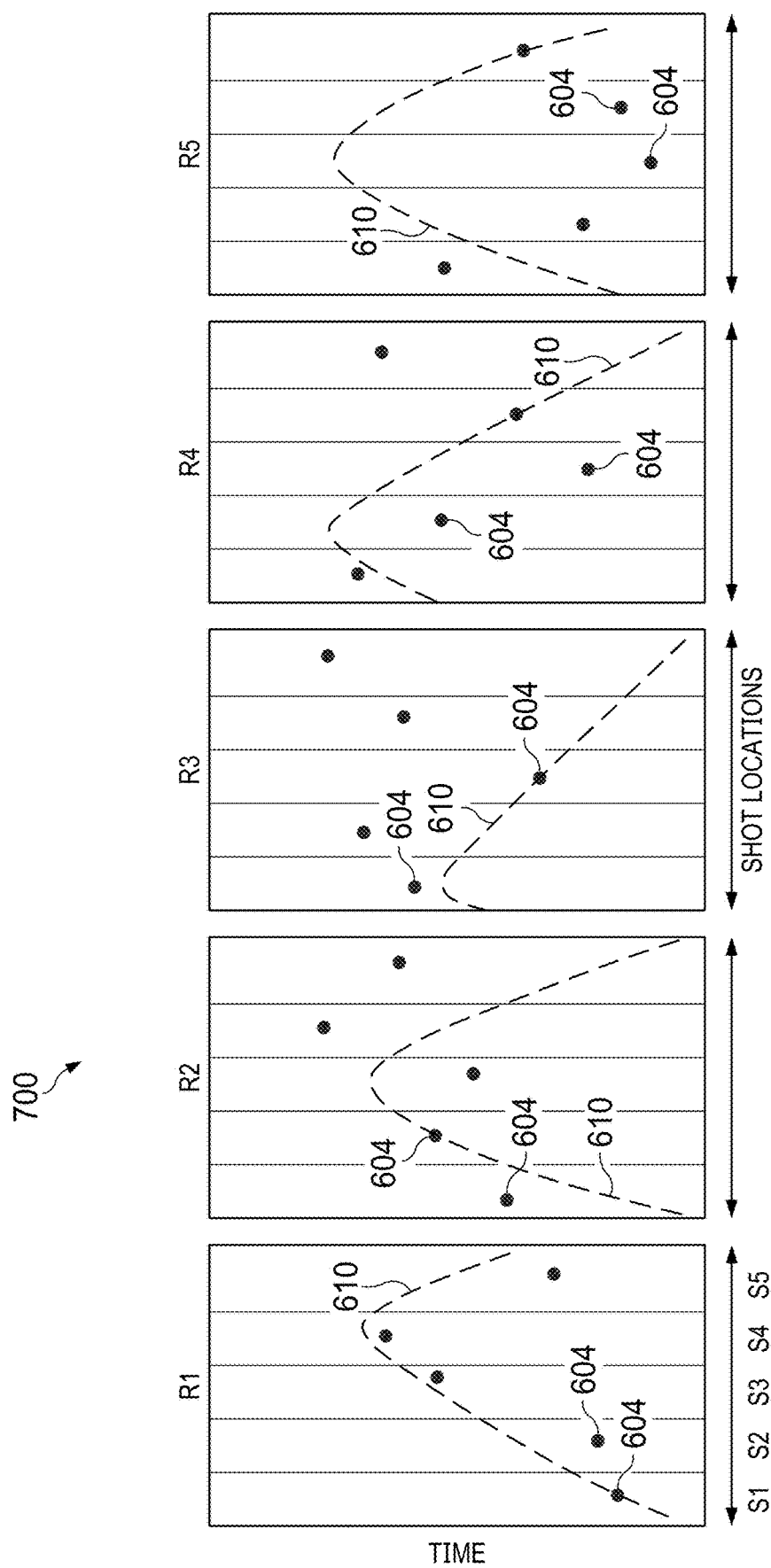
FIG. 7 is a set of graphs showing examples of actual events in a same receiver domain, according to some implementations of the present disclosure.

FIG. 7 is a set of graphs 700 showing examples of actual events in a same receiver domain, according to some implementations of the present disclosure. For example, the graphs 700 eliminate the events 602 from FIG. 6 which are assumed to be from a virtual source. While the events 602 would align but do not exist, events 604 scatter due to random delays representing pure blending noise gathers. As such, FIG. 7 is the same as FIG. 6, except with elimination of virtual shots. A dashed line 610 indicates where the events 604 would occur if traces were to be aligned for the time delays of the corresponding sources. As such, the circles depicting the events 604 correspond to actual data. The events 604 provide an example for the receiver domain for virtual sources 106 of FIG. 1.

FIGS. 8A-8B are diagrams showing examples of conceptual transitions 800 and 801 for gathers represented by signal and noise dictionaries, respectively, according to some implementations of the present disclosure. Example inputs are shown for separate dictionary learning processes. Gather 802 (for example, taken from FIG. 3) corresponds to a signal dictionary and can be used to identify coherent events 804. Gather 806 (for example, taken from FIG. 7) corresponds to a noise dictionary and can be used to identify incoherent, random noise bursts 808. The gather 806 produces examples 810 of potential data patches (or overlapping windows) to be considered as atoms.

Figure 9:
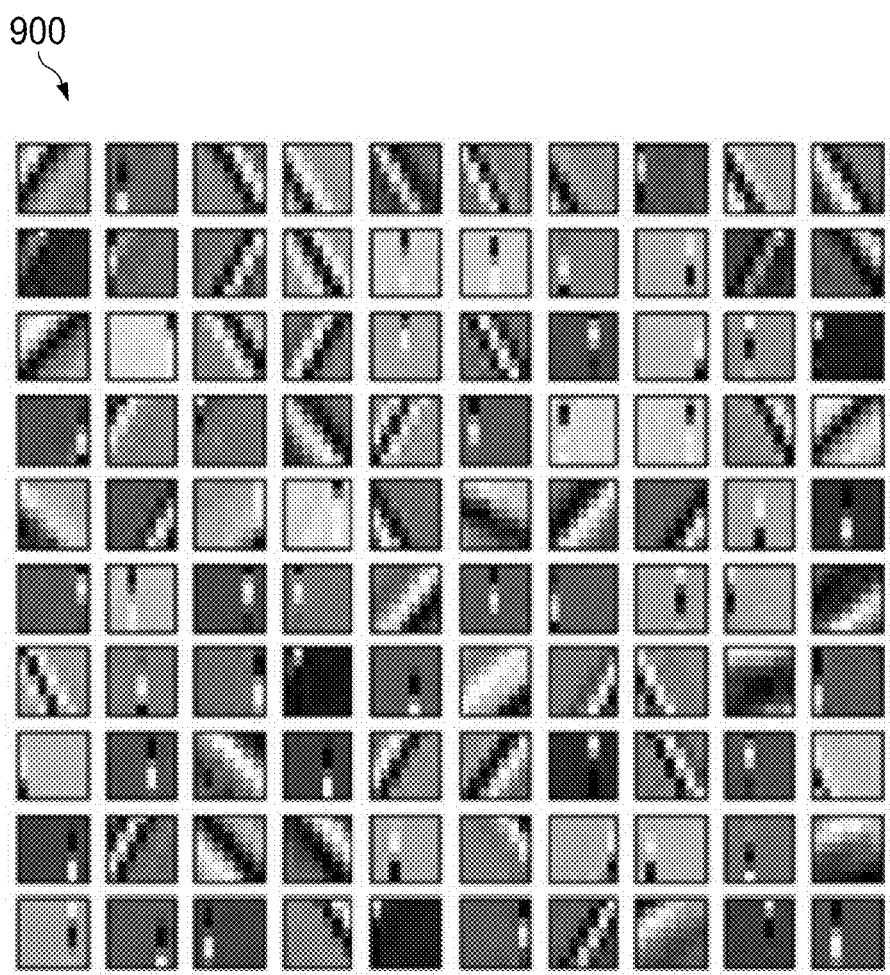
FIG. 9 is a plot showing an example of a single dictionary derived from blended data in a receiver domain, according to some implementations of the present disclosure.

FIG. 9 is a plot showing an example of a single dictionary 900 derived from blended data in a receiver domain, according to some implementations of the present disclosure. For example, the dictionary 900 can be learned from blended signal patches. The dictionary 900 clearly contains a mixture of atoms. Some of the atoms can be related to signal (for example, corresponding to mostly dipping events in a patch). Further, some of the atoms can be related to noise (for example, corresponding mostly to just a vertical stripe in a patch). Finally, some of the atoms can contain both signal and noise. Determining what each atom contains can create a challenge, for example, that can be circumvented or avoided by using techniques of the present disclosure.

FIG. 10 is a plot showing an example of a dictionary 1000 of signal atoms, according to some implementations of the present disclosure. The dictionary 1000 can be learned from signal patches, for example.

FIG. 11 is a plot showing an example of a dictionary 1100 of noise atoms, according to some implementations of the present disclosure. The dictionary 1100 can be learned from noise patches, for example.

Figure 12:
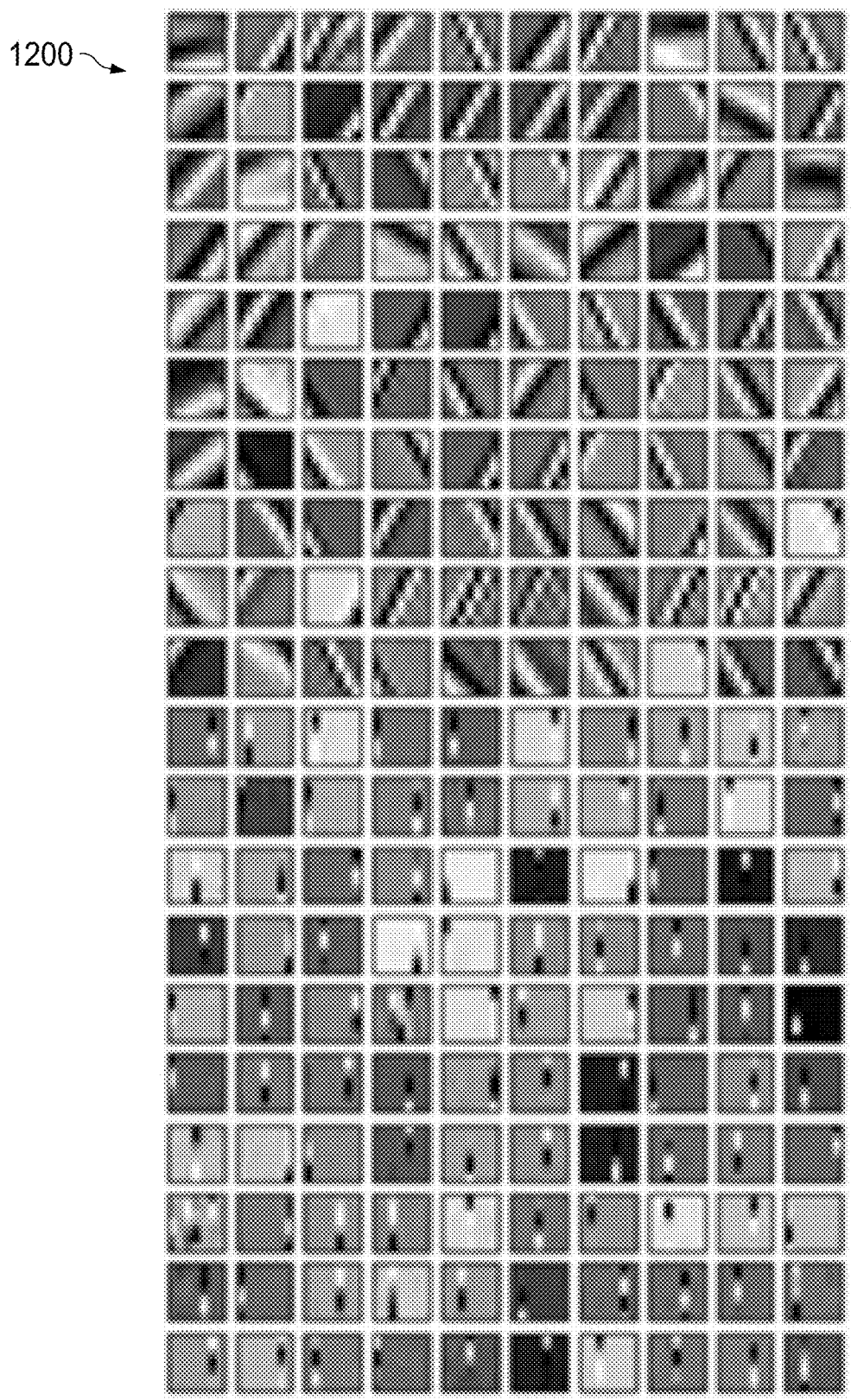
FIG. 12 is a plot showing an example of a combined dictionary of separately derived signal and noise atoms, according to some implementations of the present disclosure.

FIG. 12 is a plot showing an example of a combined dictionary 1200 of separately derived signal and noise atoms, according to some implementations of the present disclosure. The combined dictionary 1200 makes it possible to determine whether the atom is a signal atom or a noise atom.

Initial results produced by using the techniques of the present disclosure on a basic synthetic data example (using a single gather and a small dictionary) are provided in FIGS. 13 through 19. The results are based on the sample that had not been optimized in terms of the size of data patches or the number of atoms to use.

Figure 13:
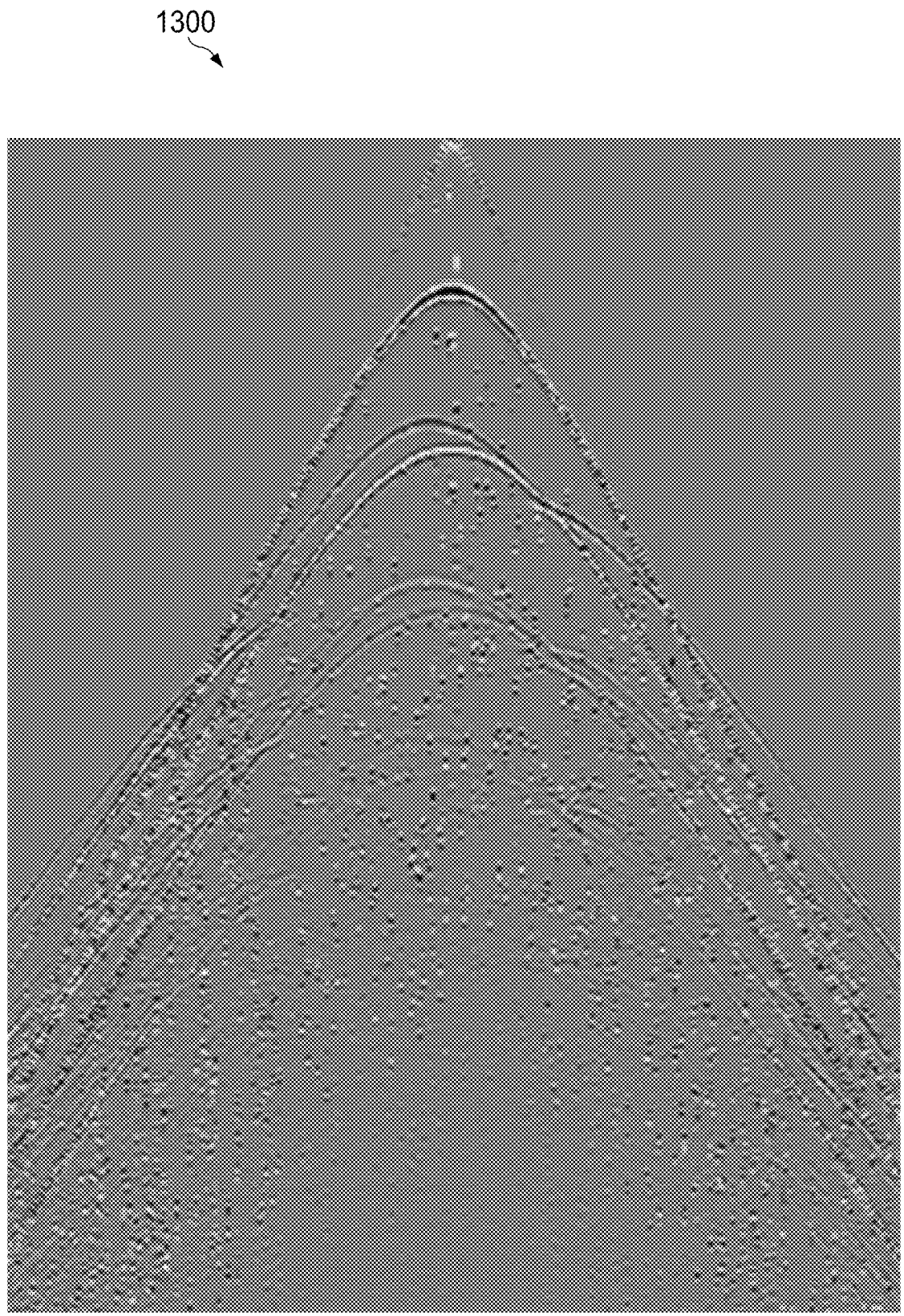
FIG. 13 is a plot showing an example of blended input data, according to some implementations of the present disclosure.

FIG. 13 is a plot showing an example of blended input data 1300, according to some implementations of the present disclosure.

Figure 14:
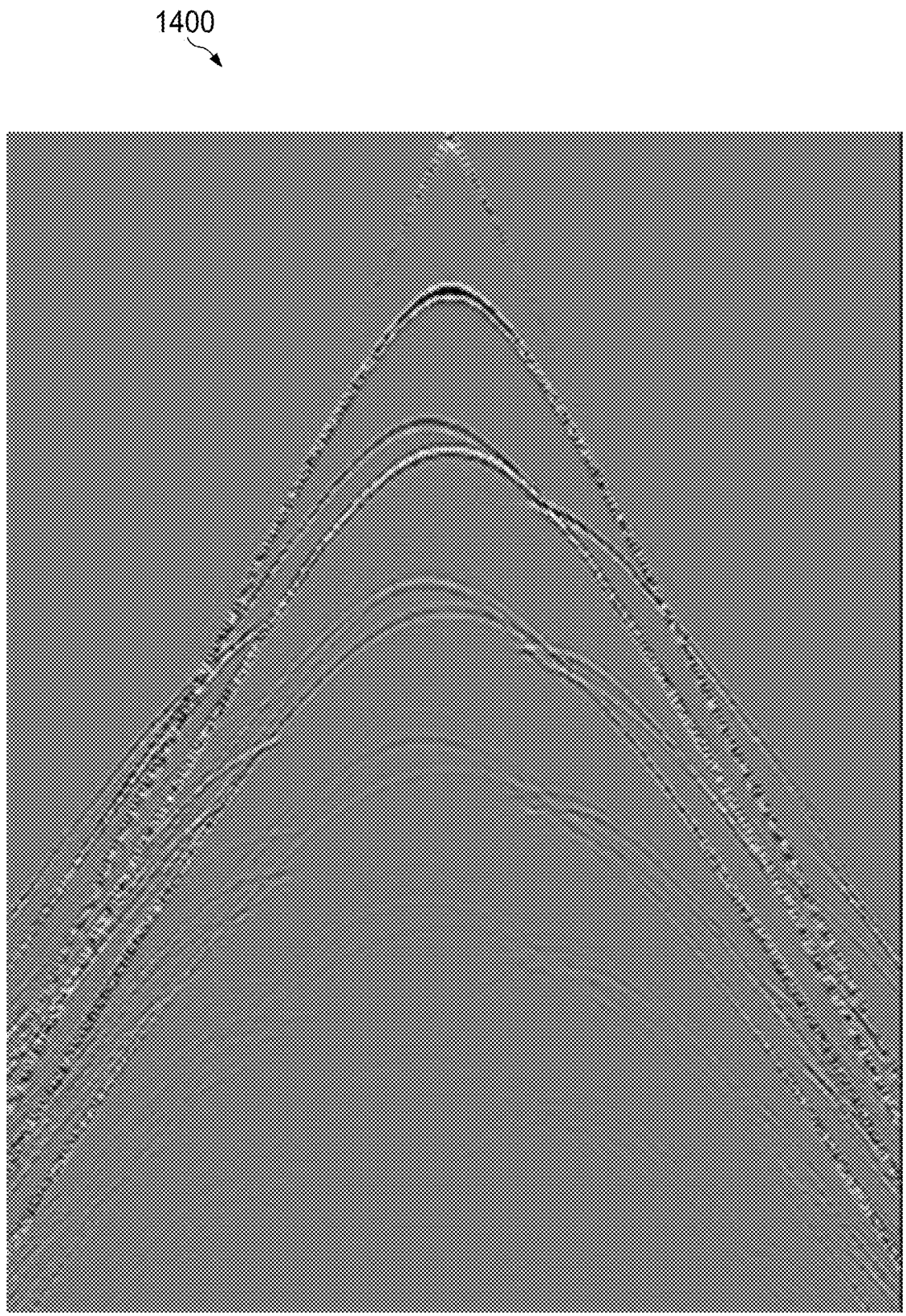
FIG. 14 is a plot showing an example of reference, according to some implementations of the present disclosure.

FIG. 14 is a plot showing an example of reference 1400, according to some implementations of the present disclosure. For example, the reference 1400 can be unblended data.

Figure 15:
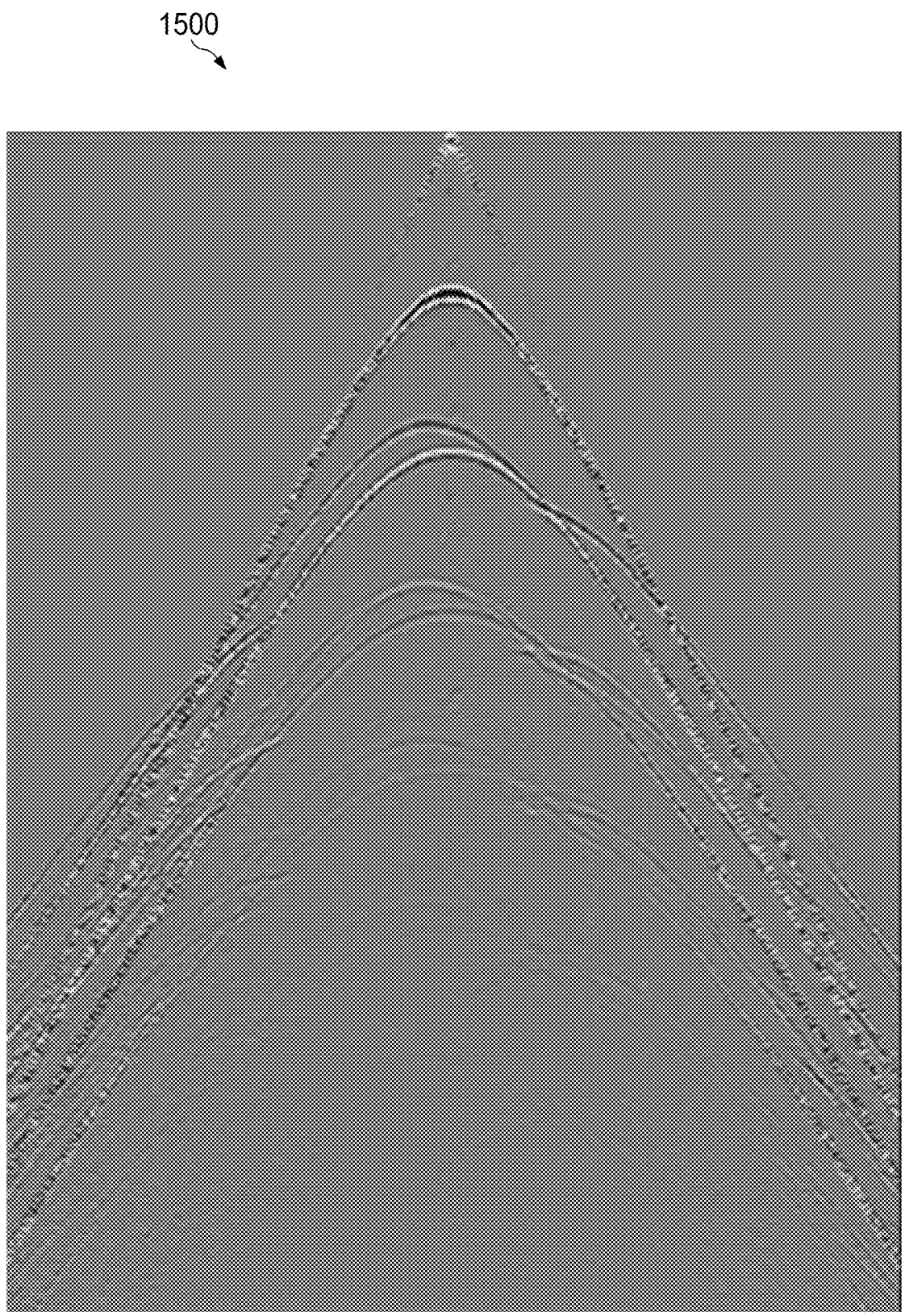
FIG. 15 is a plot showing an example of a deblended result, according to some implementations of the present disclosure.

FIG. 15 is a plot showing an example of a deblended result 1500, according to some implementations of the present disclosure. For example, the deblended result 1500 is generated using a combined dictionary of 24 atoms.

Figure 16:
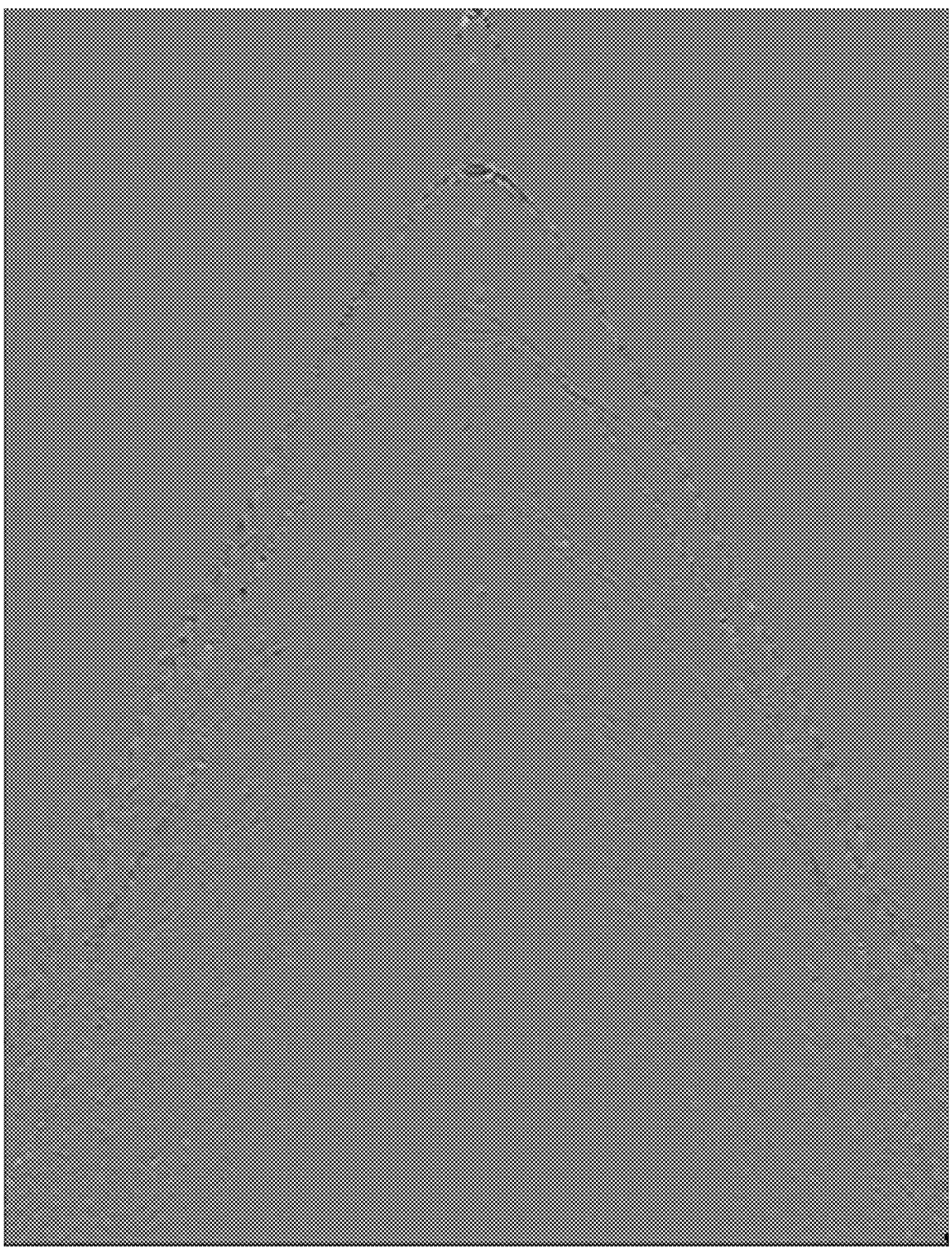
FIG. 16 is a plot showing an example of differences between the reference of FIG. 14 and the deblended result of FIG. 15, according to some implementations of the present disclosure.

FIG. 16 is a plot 1600 showing an example of differences between the reference 1400 of FIG. 14 and the deblended result 1500 of FIG. 15, according to some implementations of the present disclosure. As shown in FIG. 16, the differences occur mostly on the steeply dipping flanks and around some of the stronger curved apices. These differences are an indication, for example, that the events were not yet accommodated sufficiently by the derived dictionary.

Figure 17:
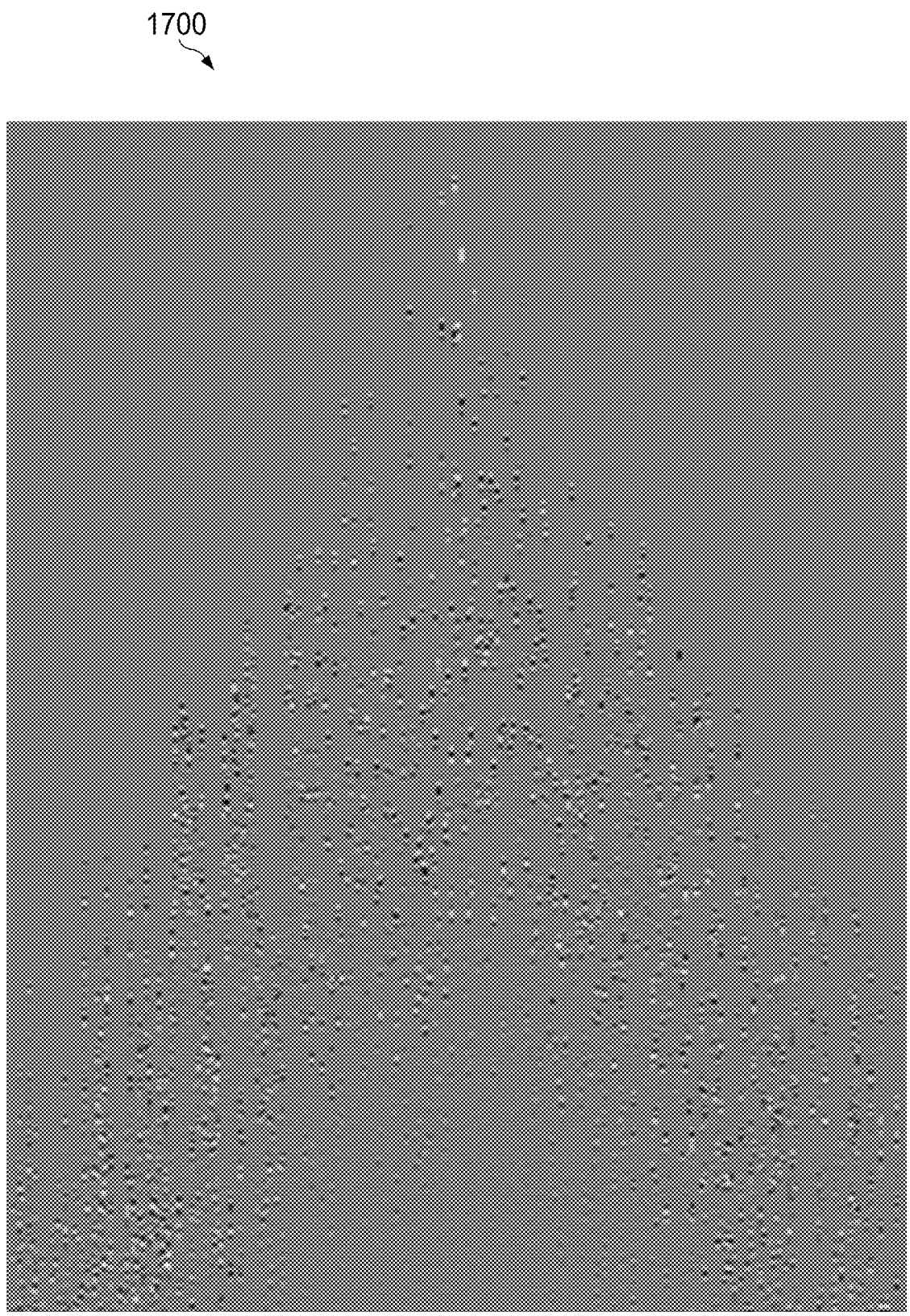
FIG. 17 is a plot showing an example of reference blending noise, according to some implementations of the present disclosure.

FIG. 17 is a plot showing an example of reference blending noise 1700, according to some implementations of the present disclosure. For example, the reference blending noise 1700 indicates a difference between the blended input data 1300 of FIG. 13 and the reference 1400 of FIG. 14.

Figure 18:
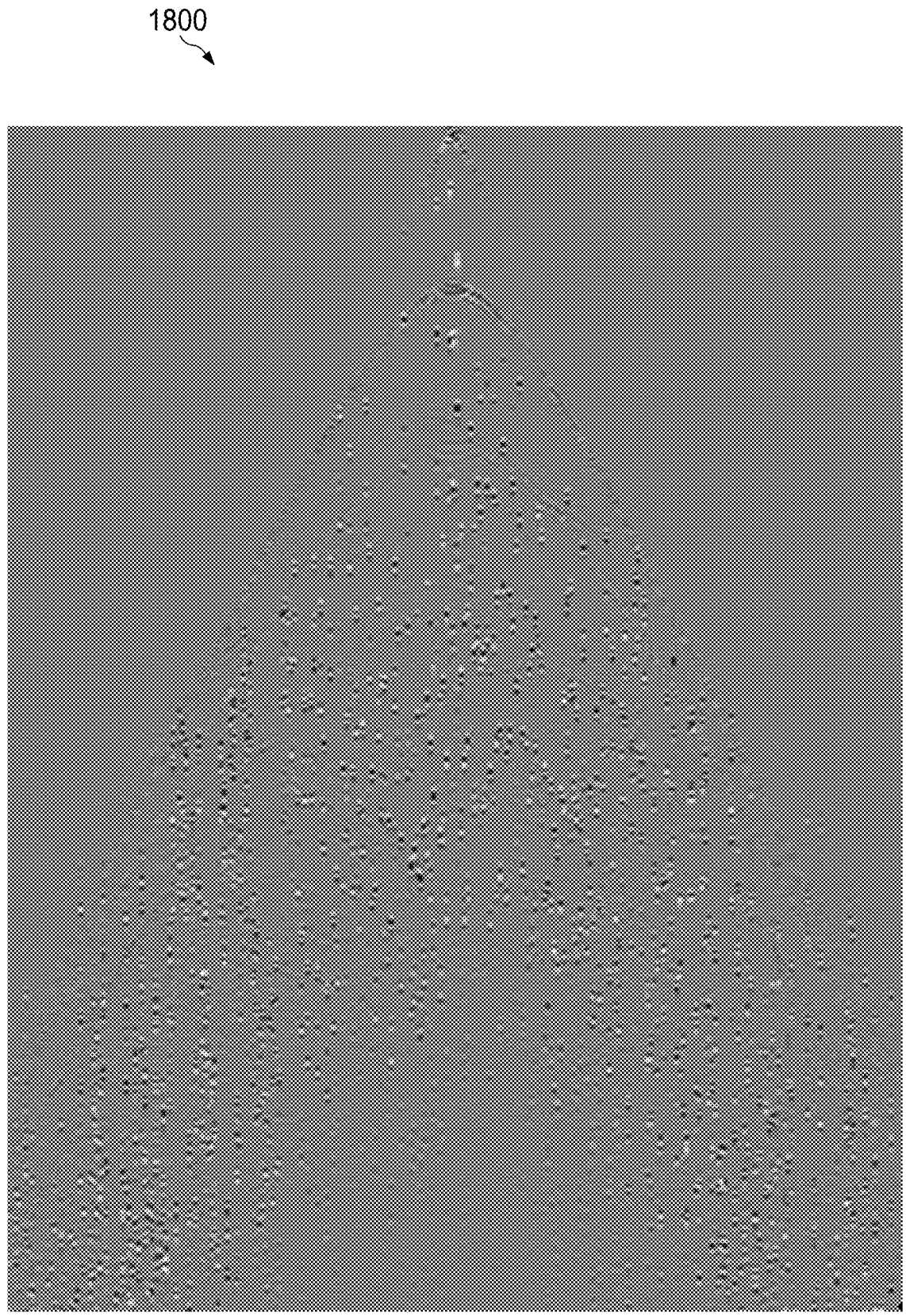
FIG. 18 is a plot showing an example of a retrieved blending noise or a difference between FIGS. 13 and 15, according to some implementations of the present disclosure.

FIG. 18 is a plot 1800 showing an example of a retrieved blending noise or a difference between FIGS. 13 and 15, according to some implementations of the present disclosure.

Figure 19:
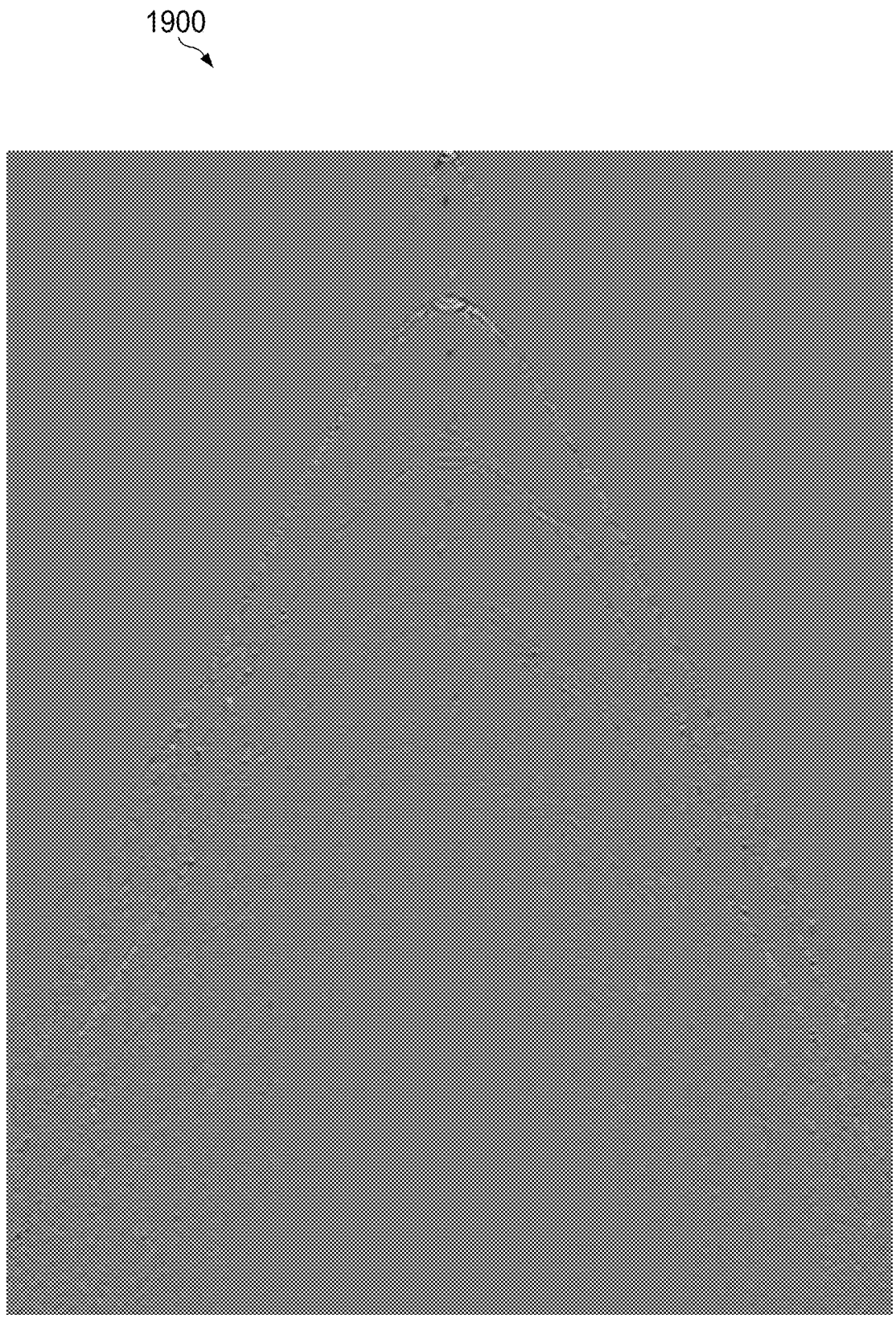
FIG. 19 is a plot showing an example of difference between the reference of FIG. 17 and the retrieved blending noise of FIG. 18, according to some implementations of the present disclosure.

FIG. 19 is a plot 1900 showing an example of difference between the reference of FIG. 17 and the retrieved blending noise of FIG. 18, according to some implementations of the present disclosure. Some signal leakage can be observed in this noise gather, but this result is an initial attempt.

In some implementations, the data in the receiver domain can be represented entirely by atoms from either the signal dictionary or the noise dictionary, such as if a large number of those atoms can be used. This effect is similar to what is generally referred to as overfitting, and strategies (for example, cross-validation) can be used to prevent overfitting from happening. Similarly, when a combined dictionary of signal and noise atoms is used and a requested residual is set too low, some crossover or leakage can occur in which some signal is explained by noise atoms and some noise is explained by signal atoms. Requested residual settings can be based on particular circumstances that contribute to sources of noise. Requested residual settings being "too low" can refer to settings that impede the identification of noise sources. Noise includes blending noise, which represents signal (when viewed in the shot domain). However, field data also contains actual noise. The requested residual can refer to a threshold setting below which the part of the field data will not be explained by the atoms or for which users do not want the field data to be represented by the atoms. If a threshold setting is set to values that are too low (depending on particular circumstances), then the method will try to explain at least some of the actual noise as well. The method will do this at the expense of explaining the signal and blending noise. It is common practice to use the signal-to-(actual) noise ratio to derive and set a threshold for the requested residual. The ratio can be determined for instance from areas in the data without blending noise. In some implementations, a user can decide to correct residual values for different reasons. For example, a decision to correct the residual values can follow from a quality control (QC) check of the deblended signal, the blending noise parts, and the residual. A strong correlation (for example, exceeding one percent) between residual and the deblended signal can indicate that not all signal has been retrieved. However, by using a higher target residual and iterating between sources, these types of leakage and similar issues can be resolved or avoided. In some implementations, post-processing can be used on the deblending results of the combined dictionary in order to improve the quality of the atoms.

Figure 20:
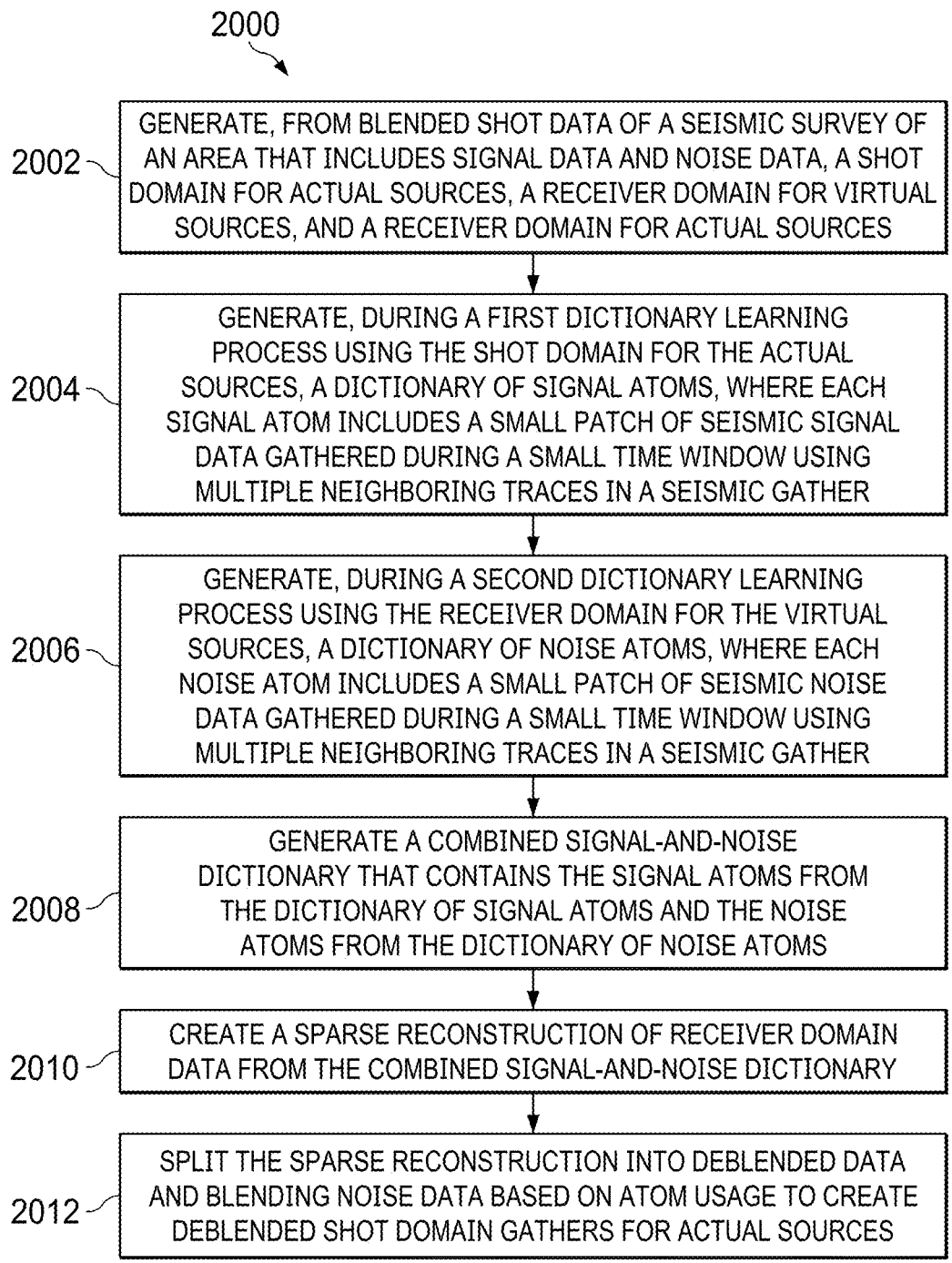
FIG. 20 is a flowchart of an example method for using virtual shots to deblend signal and noise, according to some implementations of the present disclosure.

FIG. 20 is a flowchart of an example method 2000 for using virtual shots to deblend signal and noise, according to some implementations of the present disclosure. For clarity of presentation, the description that follows generally describes method 2000 in the context of the other figures in this description. However, it will be understood that method 2000 can be performed, for example, by any suitable system, environment, software, and hardware, or a combination of systems, environments, software, and hardware, as appropriate. In some implementations, various steps of method 2000 can be run in parallel, in combination, in loops, or in any order.

At 2002, a shot domain for actual sources, a receiver domain for virtual sources, and a receiver domain for actual sources are generated from blended shot data of a seismic survey of an area that includes signal data and noise data. As an example, using the general deblending algorithm 100, the acquired blended data 102 can be sorted into a shot domain for the actual sources 104, a receiver domain for the virtual sources 106, and a receiver domain for the actual sources 108. From 2002, method 2000 proceeds to 2004.

At 2004, during a first dictionary learning process using the shot domain for the actual sources, a dictionary of signal atoms is generated. Each signal atom includes a small patch of seismic signal data gathered during a small time window using multiple neighboring traces in a seismic gather. For example, using the dictionary learning process 110, the shot domain for actual sources 104 can be used to create a dictionary of signal atoms 112. In some implementations, ranges associated with each of the "small patch" and the "small time window" can be in a range, for example, of 100 milliseconds of data across 20 consecutive traces. From 2004, method 2000 proceeds to 2006.

At 2006, during a second dictionary learning process using the receiver domain for the virtual sources, a dictionary of noise atoms is generated. Each noise atom includes a small patch of seismic noise data gathered during a small time window using multiple neighboring traces in a seismic gather. As an example, the dictionary learning process 114 can use the receiver domain for virtual sources 106 to create the dictionary of noise atoms 116. From 2006, method 2000 proceeds to 2008.

At 2008, a combined signal-and-noise dictionary is generated that contains the signal atoms from the dictionary of signal atoms and the noise atoms from the dictionary of noise atoms. For example, the dictionary of signal atoms 112 and the dictionary of noise atoms 116 can be combined into the combined dictionary of signal and noise atoms 118. From 2008, method 2000 proceeds to 2010.

At 2010, a sparse reconstruction of receiver domain data is created from the combined signal-and-noise dictionary. The sparse reconstruction step 120, for example, can be used to perform a sparse reconstruction of receiver domain data from the combined dictionary. From 2010, method 2000 proceeds to 2012.

At 2012, the sparse reconstruction is split into deblended data and blending noise data based on atom usage to create deblended shot domain gathers for actual sources. For example, the splitting step 122 can be used to split the combined dictionary into deblended data and blended noise data based on atom usage, producing deblended shot domain gathers for the actual sources 124. After 2012, method 2000 can stop.

In some implementations, method 2000 can further include receiving the blended shot data during the seismic survey. For example, blended shot gathers from the primary sources 202 and the secondary sources 204 can be received.

Figure 21:
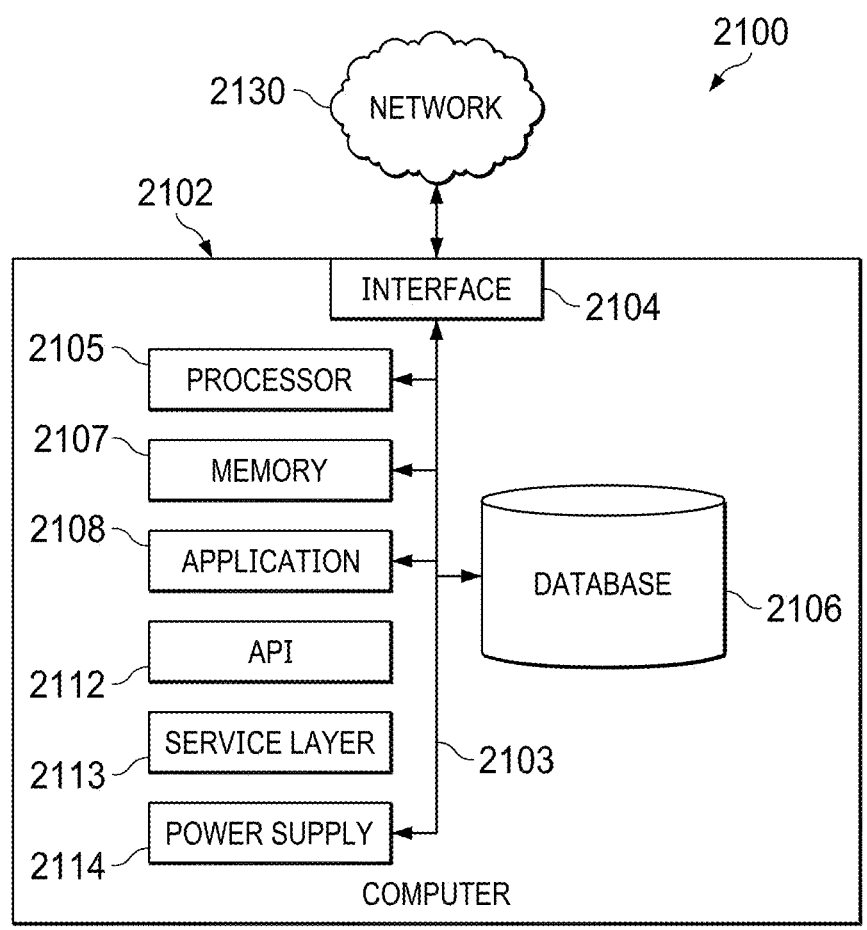
FIG. 21 is a block diagram illustrating an example computer system used to provide computational functionalities associated with described algorithms, methods, functions, processes, flows, and procedures as described in the present disclosure, according to some implementations of the present disclosure.

FIG. 21 is a block diagram of an example computer system 2100 used to provide computational functionalities associated with described algorithms, methods, functions, processes, flows, and procedures described in the present disclosure, according to some implementations of the present disclosure. The illustrated computer 2102 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 2102 can include input devices such as keypads, keyboards, and touch screens that can accept user information. Also, the computer 2102 can include output devices that can convey information associated with the operation of the computer 2102. The information can include digital data, visual data, audio information, or a combination of information. The information can be presented in a graphical user interface (UI) (or GUI).

The computer 2102 can serve in a role as a client, a network component, a server, a database, a persistency, or components of a computer system for performing the subject matter described in the present disclosure. The illustrated computer 2102 is communicably coupled with a network 2130. In some implementations, one or more components of the computer 2102 can be configured to operate within different environments, including cloud-computing-based environments, local environments, global environments, and combinations of environments.

At a high level, the computer 2102 is an electronic computing device operable to receive, transmit, process, store, and manage data and information associated with the described subject matter. According to some implementations, the computer 2102 can also include, or be communicably coupled with, an application server, an email server, a web server, a caching server, a streaming data server, or a combination of servers.

The computer 2102 can receive requests over network 2130 from a client application (for example, executing on another computer 2102). The computer 2102 can respond to the received requests by processing the received requests using software applications. Requests can also be sent to the computer 2102 from internal users (for example, from a command console), external (or third) parties, automated applications, entities, individuals, systems, and computers.

Each of the components of the computer 2102 can communicate using a system bus 2103. In some implementations, any or all of the components of the computer 2102, including hardware or software components, can interface with each other or the interface 2104 (or a combination of both), over the system bus 2103. Interfaces can use an application programming interface (API) 2112, a service layer 2113, or a combination of the API 2112 and service layer 2113. The API 2112 can include specifications for routines, data structures, and object classes. The API 2112 can be either computer-language independent or dependent. The API 2112 can refer to a complete interface, a single function, or a set of APIs.

The service layer 2113 can provide software services to the computer 2102 and other components (whether illustrated or not) that are communicably coupled to the computer 2102. The functionality of the computer 2102 can be accessible for all service consumers using this service layer. Software services, such as those provided by the service layer 2113, can provide reusable, defined functionalities through a defined interface. For example, the interface can be software written in JAVA, C++, or a language providing data in extensible markup language (XML) format. While illustrated as an integrated component of the computer 2102, in alternative implementations, the API 2112 or the service layer 2113 can be stand-alone components in relation to other components of the computer 2102 and other components communicably coupled to the computer 2102. Moreover, any or all parts of the API 2112 or the service layer 2113 can be implemented as child or sub-modules of another software module, enterprise application, or hardware module without departing from the scope of the present disclosure.

The computer 2102 includes an interface 2104. Although illustrated as a single interface 2104 in FIG. 21, two or more interfaces 2104 can be used according to particular needs, desires, or particular implementations of the computer 2102 and the described functionality. The interface 2104 can be used by the computer 2102 for communicating with other systems that are connected to the network 2130 (whether illustrated or not) in a distributed environment. Generally, the interface 2104 can include, or be implemented using, logic encoded in software or hardware (or a combination of software and hardware) operable to communicate with the network 2130. More specifically, the interface 2104 can include software supporting one or more communication protocols associated with communications. As such, the network 2130 or the interface's hardware can be operable to communicate physical signals within and outside of the illustrated computer 2102.

The computer 2102 includes a processor 2105. Although illustrated as a single processor 2105 in FIG. 21, two or more processors 2105 can be used according to particular needs, desires, or particular implementations of the computer 2102 and the described functionality. Generally, the processor 2105 can execute instructions and can manipulate data to perform the operations of the computer 2102, including operations using algorithms, methods, functions, processes, flows, and procedures as described in the present disclosure.

The computer 2102 also includes a database 2106 that can hold data for the computer 2102 and other components connected to the network 2130 (whether illustrated or not). For example, database 2106 can be an in-memory, conventional, or a database storing data consistent with the present disclosure. In some implementations, database 2106 can be a combination of two or more different database types (for example, hybrid in-memory and conventional databases) according to particular needs, desires, or particular implementations of the computer 2102 and the described functionality. Although illustrated as a single database 2106 in FIG. 21, two or more databases (of the same, different, or combination of types) can be used according to particular needs, desires, or particular implementations of the computer 2102 and the described functionality. While database 2106 is illustrated as an internal component of the computer 2102, in alternative implementations, database 2106 can be external to the computer 2102.

The computer 2102 also includes a memory 2107 that can hold data for the computer 2102 or a combination of components connected to the network 2130 (whether illustrated or not). Memory 2107 can store any data consistent with the present disclosure. In some implementations, memory 2107 can be a combination of two or more different types of memory (for example, a combination of semiconductor and magnetic storage) according to particular needs, desires, or particular implementations of the computer 2102 and the described functionality. Although illustrated as a single memory 2107 in FIG. 21, two or more memories 2107 (of the same, different, or combination of types) can be used according to particular needs, desires, or particular implementations of the computer 2102 and the described functionality. While memory 2107 is illustrated as an internal component of the computer 2102, in alternative implementations, memory 2107 can be external to the computer 2102.

The application 2108 can be an algorithmic software engine providing functionality according to particular needs, desires, or particular implementations of the computer 2102 and the described functionality. For example, application 2108 can serve as one or more components, modules, or applications. Further, although illustrated as a single application 2108, the application 2108 can be implemented as multiple applications 2108 on the computer 2102. In addition, although illustrated as internal to the computer 2102, in alternative implementations, the application 2108 can be external to the computer 2102.

The computer 2102 can also include a power supply 2114. The power supply 2114 can include a rechargeable or non-rechargeable battery that can be configured to be either user- or non-user-replaceable. In some implementations, the power supply 2114 can include power-conversion and management circuits, including recharging, standby, and power management functionalities. In some implementations, the power-supply 2114 can include a power plug to allow the computer 2102 to be plugged into a wall socket or a power source to, for example, power the computer 2102 or recharge a rechargeable battery.

There can be any number of computers 2102 associated with, or external to, a computer system containing computer 2102, with each computer 2102 communicating over network 2130. Further, the terms "client," "user," and other appropriate terminology can be used interchangeably, as appropriate, without departing from the scope of the present disclosure. Moreover, the present disclosure contemplates that many users can use one computer 2102 and one user can use multiple computers 2102.

Described implementations of the subject matter can include one or more features, alone or in combination.

For example, in a first implementation, a computer-implemented method for deblending signal and noise data includes the following. A shot domain for actual sources, a receiver domain for virtual sources, and a receiver domain for actual sources are generated from blended shot data of a seismic survey of an area that includes signal data and noise data. During a first dictionary learning process using the shot domain for the actual sources, a dictionary of signal atoms is generated. Each signal atom includes a small patch of seismic signal data gathered during a small time window using multiple neighboring traces in a seismic gather. During a second dictionary learning process using the receiver domain for the virtual sources, a dictionary of noise atoms is generated. Each noise atom includes a small patch of seismic noise data gathered during a small time window using multiple neighboring traces in a seismic gather. A combined signal-and-noise dictionary is generated that contains the signal atoms from the dictionary of signal atoms and the noise atoms from the dictionary of noise atoms. A sparse reconstruction of receiver domain data is created from the combined signal-and-noise dictionary. The sparse reconstruction is split into deblended data and blending noise data based on atom usage to create deblended shot domain gathers for actual sources.

The foregoing and other described implementations can each, optionally, include one or more of the following features:

A first feature, combinable with any of the following features, the method further including receiving, during the seismic survey, the blended shot data.

A second feature, combinable with any of the previous or following features, where a frequency slice of two dimensional (2D) data of the seismic survey is represented by a matrix P representing a monochromatic shot gather.

A third feature, combinable with any of the previous or following features, where the matrix P is determined as a product of three matrices, where the product is given by DXS, where D represents a receiver array matrix, where X represents a transfer function of the earth, and where S represents a source matrix.

A fourth feature, combinable with any of the previous or following features, the method further including applying a time shift to one or more of the shot domain for actual sources, the receiver domain for virtual sources, and the receiver domain for actual sources.

A fifth feature, combinable with any of the previous or following features, the method further including: applying weights to individual atoms of a sub-selection of atoms; and summing the atoms with their applied weights to determine stacked patches.

A sixth feature, combinable with any of the previous or following features, the method further including performing post-processing on the deblended data to improve a quality of atoms in the deblended data.

In a second implementation, a non-transitory, computer-readable medium storing one or more instructions executable by a computer system to perform operations including the following. A shot domain for actual sources, a receiver domain for virtual sources, and a receiver domain for actual sources are generated from blended shot data of a seismic survey of an area that includes signal data and noise data. During a first dictionary learning process using the shot domain for the actual sources, a dictionary of signal atoms is generated. Each signal atom includes a small patch of seismic signal data gathered during a small time window using multiple neighboring traces in a seismic gather. During a second dictionary learning process using the receiver domain for the virtual sources, a dictionary of noise atoms is generated. Each noise atom includes a small patch of seismic noise data gathered during a small time window using multiple neighboring traces in a seismic gather. A combined signal-and-noise dictionary is generated that contains the signal atoms from the dictionary of signal atoms and the noise atoms from the dictionary of noise atoms. A sparse reconstruction of receiver domain data is created from the combined signal-and-noise dictionary. The sparse reconstruction is split into deblended data and blending noise data based on atom usage to create deblended shot domain gathers for actual sources.

The foregoing and other described implementations can each, optionally, include one or more of the following features:

A first feature, combinable with any of the following features, the operations further including receiving, during the seismic survey, the blended shot data.

A second feature, combinable with any of the previous or following features, where a frequency slice of two dimensional (2D) data of the seismic survey is represented by a matrix P representing a monochromatic shot gather.

A third feature, combinable with any of the previous or following features, where the matrix P is determined as a product of three matrices, where the product is given by DXS, where D represents a receiver array matrix, where X represents a transfer function of the earth, and where S represents a source matrix.

A fourth feature, combinable with any of the previous or following features, the operations further including applying a time shift to one or more of the shot domain for actual sources, the receiver domain for virtual sources, and the receiver domain for actual sources.

A fifth feature, combinable with any of the previous or following features, the operations further including: applying weights to individual atoms of a sub-selection of atoms; and summing the atoms with their applied weights to determine stacked patches.

A sixth feature, combinable with any of the previous or following features, the operations further including performing post-processing on the deblended data to improve a quality of atoms in the deblended data.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including the following. A shot domain for actual sources, a receiver domain for virtual sources, and a receiver domain for actual sources are generated from blended shot data of a seismic survey of an area that includes signal data and noise data. During a first dictionary learning process using the shot domain for the actual sources, a dictionary of signal atoms is generated. Each signal atom includes a small patch of seismic signal data gathered during a small time window using multiple neighboring traces in a seismic gather. During a second dictionary learning process using the receiver domain for the virtual sources, a dictionary of noise atoms is generated. Each noise atom includes a small patch of seismic noise data gathered during a small time window using multiple neighboring traces in a seismic gather. A combined signal-and-noise dictionary is generated that contains the signal atoms from the dictionary of signal atoms and the noise atoms from the dictionary of noise atoms. A sparse reconstruction of receiver domain data is created from the combined signal-and-noise dictionary. The sparse reconstruction is split into deblended data and blending noise data based on atom usage to create deblended shot domain gathers for actual sources.

The foregoing and other described implementations can each, optionally, include one or more of the following features:

A first feature, combinable with any of the following features, the operations further including receiving, during the seismic survey, the blended shot data.

A second feature, combinable with any of the previous or following features, where a frequency slice of two dimensional (2D) data of the seismic survey is represented by a matrix P representing a monochromatic shot gather.

A third feature, combinable with any of the previous or following features, where the matrix P is determined as a product of three matrices, where the product is given by DXS, where D represents a receiver array matrix, where X represents a transfer function of the earth, and where S represents a source matrix.

A fourth feature, combinable with any of the previous or following features, the operations further including applying a time shift to one or more of the shot domain for actual sources, the receiver domain for virtual sources, and the receiver domain for actual sources.

A fifth feature, combinable with any of the previous or following features, the operations further including: applying weights to individual atoms of a sub-selection of atoms; and summing the atoms with their applied weights to determine stacked patches.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/-R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    generating, from blended shot data of a seismic survey of an area that includes signal data and noise data, a shot domain for actual sources, a receiver domain for virtual sources, and a receiver domain for actual sources, wherein the shot domain includes shots provided by an array of vibration-emitting equipment, each piece of vibration-emitting equipment being a single source in the seismic survey, wherein the receiver domain for the actual sources includes shot gathers received at receiver locations, and wherein each shot gather includes signal atom data gathered during a small time window using multiple neighboring traces in a seismic gather;
    generating, during a first dictionary learning process using the shot domain for the actual sources, a dictionary of signal atoms, wherein each signal atom includes a small patch of seismic signal data gathered during the small time window using the multiple neighboring traces in the seismic gather, wherein the first dictionary learning process includes applying a time shift to one or more of the shot domain for the actual sources, wherein the first dictionary learning process identifies a set of similar signal atoms with which their respective inputs are reconstructed, and wherein a gather is one of a common source, a common receiver, a common offset, or a common midpoint gather, and wherein the small patches define time and space windows of 100 milliseconds of trace data across 20 consecutive traces;
    generating, during a second dictionary learning process using the receiver domain for the virtual sources, a dictionary of noise atoms, wherein the second dictionary learning process includes applying a time shift to the receiver domain for the virtual sources, and wherein each noise atom includes a small patch of seismic noise data gathered during a small time window using multiple neighboring traces in a seismic gather;
    generating a combined signal-and-noise dictionary that contains the signal atoms from the dictionary of signal atoms and the noise atoms from the dictionary of noise atoms;
    creating a sparse reconstruction of receiver domain data from the combined signal-and-noise dictionary; and
    splitting the sparse reconstruction into deblended data and blending noise data based on atom usage to create deblended shot domain gathers for the actual sources.

2. The computer-implemented method of claim 1, further comprising:
    receiving, during the seismic survey, the blended shot data.

3. The computer-implemented method of claim 1, wherein a frequency slice of two dimensional (2D) data of the seismic survey is represented by a matrix P representing a monochromatic shot gather.

4. The computer-implemented method of claim 3, wherein the matrix P is determined as a product of three matrices, wherein the product is given by DXS, wherein D represents a receiver array matrix, wherein X represents a transfer function of the earth, and wherein S represents a source matrix.

5. The computer-implemented method of claim 1, further comprising:
    applying weights to individual atoms of a sub-selection of atoms; and
    summing the atoms with their applied weights to determine stacked patches.

6. The computer-implemented method of claim 1, further comprising performing post-processing on the deblended data to improve a quality of atoms in the deblended data.

7. A non-transitory, computer-readable medium storing one or more instructions executable by a computer system to perform operations comprising:

generating, from blended shot data of a seismic survey of an area that includes signal data and noise data, a shot domain for actual sources, a receiver domain for virtual sources, and a receiver domain for actual sources, wherein the shot domain includes shots provided by an array of vibration-emitting equipment, each piece of vibration-emitting equipment being a single source in the seismic survey, wherein the receiver domain for the actual sources includes shot gathers received at receiver locations, and wherein each shot gather includes signal atom data gathered during a small time window using multiple neighboring traces in a seismic gather;

generating, during a first dictionary learning process using the shot domain for the actual sources, a dictionary of signal atoms, wherein each signal atom includes a small patch of seismic signal data gathered during the small time window using multiple neighboring traces in the seismic gather, wherein the first dictionary learning process includes applying a time shift to one or more of the shot domain for the actual sources, wherein the first dictionary learning process identifies a set of similar signal atoms with which their respective inputs are reconstructed, and wherein a gather is one of a common source, a common receiver, a common offset, or a common midpoint gather, and wherein the small patches define time and space windows of 100 milliseconds of trace data across 20 consecutive traces;

generating, during a second dictionary learning process using the receiver domain for the virtual sources, a dictionary of noise atoms, wherein the second dictionary learning process includes applying a time shift to the receiver domain for the virtual sources, and wherein each noise atom includes a small patch of seismic noise data gathered during a small time window using multiple neighboring traces in a seismic gather;

generating a combined signal-and-noise dictionary that contains the signal atoms from the dictionary of signal atoms and the noise atoms from the dictionary of noise atoms;

creating a sparse reconstruction of receiver domain data from the combined signal-and-noise dictionary; and splitting the sparse reconstruction into deblended data and blending noise data based on atom usage to create deblended shot domain gathers for the actual sources.

8. The non-transitory, computer-readable medium of claim 7, the operations further comprising:
receiving, during the seismic survey, the blended shot data.

9. The non-transitory, computer-readable medium of claim 7, wherein a frequency slice of two dimensional (2D) data of the seismic survey is represented by a matrix P representing a monochromatic shot gather.

10. The non-transitory, computer-readable medium of claim 9, wherein the matrix P is determined as a product of three matrices, wherein the product is given by DXS, wherein D represents a receiver array matrix, wherein X represents a transfer function of the earth, and wherein S represents a source matrix.

11. The non-transitory, computer-readable medium of claim 7, the operations further comprising:
applying weights to individual atoms of a sub-selection of atoms; and
summing the atoms with their applied weights to determine stacked patches.

12. The non-transitory, computer-readable medium of claim 7, the operations further comprising performing post-processing on the deblended data to improve a quality of atoms in the deblended data.

13. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
generating, from blended shot data of a seismic survey of an area that includes signal data and noise data, a shot domain for actual sources, a receiver domain for virtual sources, and a receiver domain for actual sources, wherein the shot domain includes shots provided by an array of vibration-emitting equipment, each piece of vibration-emitting equipment being a single source in the seismic survey, wherein the receiver domain for the actual sources includes shot gathers received at receiver locations, and wherein each shot gather includes signal atom data gathered during a small time window using multiple neighboring traces in a seismic gather;
generating, during a first dictionary learning process using the shot domain for the actual sources, a dictionary of signal atoms, wherein each signal atom includes the small patch of seismic signal data gathered during a small time window using multiple neighboring traces in the seismic gather, wherein the first dictionary learning process includes applying a time shift to one or more of the shot domain for the actual sources, wherein the first dictionary learning process identifies a set of similar signal atoms with which their respective inputs are reconstructed, and wherein a gather is one of a common source, a common receiver, a common offset, or a common midpoint gather, and wherein the small patches define time and space windows of 100 milliseconds of trace data across 20 consecutive traces;
generating, during a second dictionary learning process using the receiver domain for the virtual sources, a dictionary of noise atoms, wherein the second dictionary learning process includes applying a time shift to the receiver domain for the virtual sources, and wherein each noise atom includes a small patch of seismic noise data gathered during a small time window using multiple neighboring traces in a seismic gather;
generating a combined signal-and-noise dictionary that contains the signal atoms from the dictionary of signal atoms and the noise atoms from the dictionary of noise atoms;
creating a sparse reconstruction of receiver domain data from the combined signal-and-noise dictionary; and
splitting the sparse reconstruction into deblended data and blending noise data based on atom usage to create deblended shot domain gathers for the actual sources.

14. The computer-implemented system of claim 13, the operations further comprising:
receiving, during the seismic survey, the blended shot data.

15. The computer-implemented system of claim 13, wherein a frequency slice of two dimensional (2D) data of the seismic survey is represented by a matrix P representing a monochromatic shot gather.

16. The computer-implemented system of claim 15, wherein the matrix P is determined as a product of three matrices, wherein the product is given by DXS, wherein D represents a receiver array matrix, wherein X represents a transfer function of the earth, and wherein S represents a source matrix.

17. The computer-implemented system of claim 13, the operations further comprising:
   applying weights to individual atoms of a sub-selection of atoms; and
   summing the atoms with their applied weights to determine stacked patches.

\* \* \* \* \*